United States Patent
Lai et al.

(10) Patent No.: US 12,242,939 B2
(45) Date of Patent: Mar. 4, 2025

(54) METHOD, SYSTEM, AND COMPUTER PROGRAM PRODUCT FOR SYNTHETIC OVERSAMPLING FOR BOOSTING SUPERVISED ANOMALY DETECTION

(71) Applicant: Visa International Service Association, San Francisco, CA (US)

(72) Inventors: Kwei-Herng Lai, Houston, TX (US); Lan Wang, Sunnyvale, CA (US); Huiyuan Chen, San Jose, CA (US); Mangesh Bendre, Sunnyvale, CA (US); Mahashweta Das, Campbell, CA (US); Hao Yang, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/686,563

(22) PCT Filed: Aug. 4, 2023

(86) PCT No.: PCT/IB2023/057912
§ 371 (c)(1),
(2) Date: Feb. 26, 2024

(87) PCT Pub. No.: WO2024/033771
PCT Pub. Date: Feb. 15, 2024

(65) Prior Publication Data
US 2024/0281718 A1    Aug. 22, 2024

Related U.S. Application Data

(60) Provisional application No. 63/397,719, filed on Aug. 12, 2022.

(51) Int. Cl.
*G06N 20/00*    (2019.01)
*G06F 18/2413*    (2023.01)

(52) U.S. Cl.
CPC ....... *G06N 20/00* (2019.01); *G06F 18/24147* (2023.01)

(58) Field of Classification Search
CPC .......................... G06N 20/00; G06F 18/24147
See application file for complete search history.

(56) References Cited

U.S. PATENT DOCUMENTS

| | | |
|---|---|---|
| 2016/0110584 A1 | 4/2016 | Remiszewski et al. |
| 2019/0227536 A1 | 7/2019 | Cella et al. |
| 2019/0259041 A1 | 8/2019 | Jackson |
| 2020/0314127 A1 | 10/2020 | Wilson et al. |

(Continued)

OTHER PUBLICATIONS

Ma, "AESMOTE: Adversarial Reinforcement Learning With SMOTE for Anomaly Detection", IEEE Transactions on Network Science and Engineering, vol. 8, No. 2, Apr.-Jun. 2021. (Year: 2021).*

(Continued)

*Primary Examiner* — Dave Misir
(74) *Attorney, Agent, or Firm* — The Webb Law Firm

(57) ABSTRACT

Methods, systems, and computer program products may formulate an iterative data mix up problem into a Markov decision process (MDP) with a tailored reward signal to guide a learning process. To solve the MDP, a deep deterministic actor-critic framework may be modified to adapt a discrete-continuous decision space for training a data augmentation policy.

15 Claims, 13 Drawing Sheets

(56) References Cited

U.S. PATENT DOCUMENTS

2022/0391299 A1* 12/2022 Bharadwaj .......... G06F 11/0757
2023/0118240 A1* 4/2023 Wong .................... G06N 3/045
705/44

OTHER PUBLICATIONS

Harjai, "Detecting Fraudulent Insurance Claims Using Random Forests and Synthetic Minority Oversampling Technique", 2019 4th International Conference on Information Systems and Computer Networks (ISCON) GLA University, Mathura, UP, India. Nov. 21-22, 2019. (Year: 2019).*
Al-Hashedi et al., "Financial fraud detection applying data mining techniques: A comprehensive review from 2009 to 2019." Computer Science Review 40 (2021): 100402.
Bunkhumpornpat et al., "DBSMOTE: density-based synthetic minority over-sampling technique." Applied Intelligence 36 (2012): 664-684.
Cao et al., "Learning to transfer examples for partial domain adaptation." Proceedings of the IEEE/CVF conference on computer vision and pattern recognition. 2019.
Chapelle et al., "Semi-supervised learning (chapelle, o et al., eds.; 2006)[book reviews]." IEEE Transactions on Neural Networks 20.3 (2009): 542-542.
Chawla et al., "SMOTE: synthetic minority over-sampling technique." Journal of artificial intelligence research 16 (2002): 321-357.
Feng et al., "A survey of data augmentation approaches for NLP." arXiv preprint arXiv:2105.03075 (2021).
Haarnoja et al., "Soft actor-critic: Off-policy maximum entropy deep reinforcement learning with a stochastic actor." International conference on machine learning. PMLR, 2018.
Han et al., "Borderline-SMOTE: a new over-sampling method in imbalanced data sets learning." International conference on intelligent computing. Berlin, Heidelberg: Springer Berlin Heidelberg, 2005.
He et al., "ADASYN: Adaptive synthetic sampling approach for imbalanced learning." 2008 IEEE international joint conference on neural networks (IEEE world congress on computational intelligence). Ieee, 2008.
Hsu et al., "Multiple time-series convolutional neural network for fault detection and diagnosis and empirical study in semiconductor manufacturing." Journal of Intelligent Manufacturing 32 (2021): 823-836.
Ienco et al., "A semisupervised approach to the detection and characterization of outliers in categorical data." IEEE transactions on neural networks and learning systems 28.5 (2016): 1017-1029.
Kabra et al., "Mixboost: Synthetic oversampling with boosted mixup for handling extreme imbalance." arXiv preprint arXiv:2009.01571 (2020).
Kim et al., "AI-IDS: Application of deep learning to real-time Web intrusion detection." IEEE Access 8 (2020): 70245-70261.
Kovacs, "Smote-variants: A python implementation of 85 minority oversampling techniques." Neurocomputing 366 (2019): 352-354.
Li et al., "Autobalance: Optimized loss functions for imbalanced data." Advances in Neural Information Processing Systems 34 (2021): 3163-3177.
Lillicrap et al., "Continuous control with deep reinforcement learning." arXiv preprint arXiv: 1509.02971 (2015).
Liu et al., "The influence of class imbalance on cost-sensitive learning: An empirical study." sixth international conference on data mining (ICDM'06). IEEE, 2006.
Maceachern et al., "Configurable fpga-based outlier detection for time series data." 2020 IEEE 63rd International Midwest Symposium on Circuits and Systems (MWSCAS). IEEE, 2020.
Nguyen et al., "Deep neural networks are easily fooled: High confidence predictions for unrecognizable images." Proceedings of the IEEE conference on computer vision and pattern recognition. 2015.
Ouali et al., "An overview of deep semi-supervised learning." arXiv preprint arXiv:2006.05278 (2020).
Pang et al., "Deep anomaly detection with deviation networks." Proceedings of the 25th ACM SIGKDD international conference on knowledge discovery & data mining. 2019.
Pang et al., "Deep learning for anomaly detection: A review." ACM computing surveys (CSUR) 54.2 (2021): 1-38.
Pang et al., "Deep weakly-supervised anomaly detection." Proceedings of the 29th ACM SIGKDD Conference on Knowledge Discovery and Data Mining. 2023.
Pang et al., "Toward deep supervised anomaly detection: Reinforcement learning from partially labeled anomaly data." Proceedings of the 27th ACM SIGKDD conference on knowledge discovery & data mining. 2021.
Perini et al., "Quantifying the confidence of anomaly detectors in their example-wise predictions." Joint European Conference on Machine Learning and Knowledge Discovery in Databases. Cham: Springer International Publishing, 2020.
Rayana, "Odds library [http://odds. cs. stonybrook. edu]. stony brook, ny: Stony brook university." Department of Computer Science (2016).
Ruff et al., "Deep one-class classification." International conference on machine learning. PMLR, 2018.
Shorten et al., "A survey on image data augmentation for deep learning." Journal of big data 6.1 (2019): 1-48.
Sutton et al., Reinforcement learning: An introduction. MIT press, 2018.
Vanschoren et al., "OpenML: networked science in machine learning." ACM SIGKDD Explorations Newsletter 15.2 (2014): 49-60.
Wen et al., "Time series data augmentation for deep learning: A survey." arXiv preprint arXiv:2002.12478 (2020).
Wu et al., "Rlad: Time series anomaly detection through reinforcement learning and active learning." arXiv preprint arXiv:2104.00543 (2021).
Zha et al., "Meta-AAD: Active anomaly detection with deep reinforcement learning." 2020 IEEE International Conference on Data Mining (ICDM). IEEE, 2020.
Zhang et al., "mixup: Beyond empirical risk minimization." arXiv preprint arXiv:1710.09412 (2017).
Zhao et al., "Xgbod: improving supervised outlier detection with unsupervised representation learning." 2018 International Joint Conference on Neural Networks (IJCNN). IEEE, 2018.
Zhu, "Semi-supervised learning literature survey." (2005).

* cited by examiner

Algorithm 1 Training Procedure

1: Input: Input data $X^{train}$, maximum neighborhood size $K$, number of training episode $E$, DDPG training step $S$, reward coefficient $\lambda$, window size for baseline reward $m$.
2: Initialize classifier $\phi$, actor network $\pi$, critic network $Q$, memory buffer $\mathcal{B}$, $e = 0$.
3: Split partial $X^{train}$ to form $X^{val}$ and train $\phi$ on $X^{train}$.
4: Pre-compute $K$-nearest neighborhood for $X^{train}$.
5: Randomly sample a pair of source samples to form the initial state $s_0 = (x_0, x_1)$.
6: for $e = 0, 1, 2, ..., E$ do
7:     $t \leftarrow 0$.
8:     while $e < 0.5$ do
9:         Get the action $a_t = \pi(s_t)$ from actor network.
10:         Get $\alpha$, $n$ from $a_t$ and adopt Eq. 1, Eq. 2 to generate $x_{syn}$.
11:         Update $\phi$ with $x_{syn}$ and get $k$ from $a_t$.
12:         Obtain $k$-nearest neighborhood of $x_{syn}$.
13:         Form the reward $r_t = \lambda \Delta M(.) C(.)$ with $X^{val}$ and the $k$-nearest neighborhood of $x_{syn}$.
14:         Randomly choose next pair of source samples $(x_0^{t+1}, x_1^{t+1})$ from the $k$-nearest neighborhood of $x_{syn}$.
15:         Form the next state $s_{t+1} = (x_0^{t+1}, x_1^{t+1})$ and get $e$ from $a_t$.
16:         Store the triplet $T_t = (s_t, a_t, s_{t+1}, r_t)$ into $\mathcal{B}$.
17:         $t \leftarrow t + 1$.
18:         for step $= 1, 2, ..., S$ do
19:             Use data in $\mathcal{B}$ to update DDPG with Eq. 3 and Eq. 4.
20:         end for
21:     end while
22: end for

FIG. 7

| | # Samples | # Features | % Anomaly | Domain |
|---|---|---|---|---|
| Japanese Vowels | 1,456 | 12 | 3.43% | Utterance |
| Annthyroid | 7,200 | 22 | 7.42% | Clinical Record |
| Mammography | 11,183 | 6 | 2.32% | Medical Image |
| Satellite | 6,435 | 36 | 31.63% | Remote Sensing |
| SMTP | 95,156 | 41 | 0.03% | Server Log |

| Category | Methods (Prec./Rec./F1) | Dataset | | | | | Avg. | F1 ↑ |
|---|---|---|---|---|---|---|---|---|
| | | Japanese Vowels | Arrhythmia | Mammography | Satellite | SMTP | | |
| Label-Informed | KGBOD | 0.86/0.71/0.76 | 0.88/0.52/0.52 | 0.95/0.59/0.65 | 0.91/0.80/0.84 | 1.00/0.58/0.64 | 0.92/0.64/0.68 | +36.8% |
| | DevNet | 0.89/0.99/0.93 | 0.66/0.61/0.62 | 0.72/0.92/0.79 | 0.71/0.71/0.71 | 1.00/1.00/1.00 | 0.79/0.85/0.81 | +14.8% |
| | DeepSAD | 0.99/0.71/0.80 | 0.90/0.36/0.39 | 0.66/0.65/0.65 | 0.81/0.73/0.75 | 0.99/0.71/0.80 | 0.87/0.68/0.72 | +29.9% |
| | Best Baseline | 0.89/0.99/0.93 | 0.86/0.77/0.81 | 0.86/0.77/0.81 | 0.90/0.88/0.89 | 0.90/0.83/0.86 | 0.88/0.85/0.86 | +8.1% |
| Data Augmentation | AnoMix | 1.00/0.96/0.98 | 0.87/0.97/0.92 | 0.87/0.84/0.85 | 0.92/0.90/0.91 | 1.00/1.00/1.00 | 0.93/0.93/0.93 | - |

FIG. 10

| Ablations | Precision | Recall | F1-score |
|---|---|---|---|
| Random reward | 0.85 | 0.60 | 0.66 |
| w/o Improvement Stimulation (Eq. 5) | 0.98 | 0.64 | 0.71 |
| w/o Model Exploration (Eq. 6) | 0.98 | 0.71 | 0.79 |
| Full AnoMix | 0.99 | 0.93 | 0.96 |

FIG. 11

METHOD, SYSTEM, AND COMPUTER PROGRAM PRODUCT FOR SYNTHETIC OVERSAMPLING FOR BOOSTING SUPERVISED ANOMALY DETECTION

CROSS-REFERENCE TO RELATED APPLICATIONS

This application is the United States national phase of International Application No. PCT/IB2023/057912 filed Aug. 4, 2023, and claims the benefit of U.S. Provisional Application No. 63/397,719, filed Aug. 12, 2022, the disclosures of which are hereby incorporated by reference in their entirety.

BACKGROUND

1. Technical Field

This disclosure relates to synthetic oversampling and, in some non-limiting embodiments or aspects, to methods, systems, and computer program products for synthetic oversampling for boosting supervised anomaly detection.

2. Technical Considerations

Training an anomaly detector may be challenging due to label sparsity and/or a diverse distribution of known anomalies. Existing approaches typically use unsupervised or semi-supervised learning in an attempt to alleviate these issues. However, semi-supervised learning may directly adopt the limited label information, which may lead to a model that overfits on existing anomalies, while unsupervised learning may ignore the label information, which may lead to low precision.

SUMMARY

Accordingly, provided are improved systems, devices, products, apparatus, and/or methods for synthetic oversampling for boosting supervised anomaly detection.

According to some non-limiting embodiments or aspects, provided is a method, comprising: obtaining, with at least one processor, a training dataset $X^{train}$ including a plurality of source samples including a plurality of labeled normal samples and a plurality of labeled anomaly samples; and executing, with the at least one processor, a training episode by: (i) initializing a timestamp t; (ii) receiving, from an actor network $\pi$ of an actor critic framework including the actor network $\pi$ and a critic network Q, an action vector $a_t$ for the timestamp t, wherein the actor network $\pi$ is configured to generate the action vector $a_t$ based on a state $s_t$, wherein the state $s_t$ is determined based on a current pair of source samples of the plurality of source samples, and wherein the action vector $a_t$ includes a size of a nearest neighborhood k, a composition ratio $\alpha$, a number of oversampling n, and a termination probability $\epsilon$; (iii) combining the current pair of source samples according to the composition ratio $\alpha$ and the number of oversampling n to generate a labeled synthetic sample $x_{syn}$ associated with a label $y_{syn}$; (iv) training, using the labeled synthetic sample $x_{syn}$ and the label $y_{syn}$, a machine learning classifier $\phi$; (v) obtaining, based on the size of a nearest neighborhood k, source samples in the k-nearest neighborhood of the labeled synthetic sample $x_{syn}$; (vi) generating, with the machine learning classifier $\phi$, for the source samples in the k-nearest neighborhood of the labeled synthetic sample $x_{syn}$ and a subset of the plurality of source samples of the training dataset $X^{train}$ in a validation dataset $X^{val}$, a plurality of classifier outputs; (vii) selecting, from the source samples in the k-nearest neighborhood of the labeled synthetic sample $x_{syn}$, a next pair of source samples; (viii) storing, in a memory buffer, the state $s_t$, the action vector $a_t$, a next state $s_{t+1}$, and a reward $r_t$, wherein the next state $s_{t+1}$ is determined based on the next pair of source samples, and wherein the reward $r_t$ is determined based on the plurality of classifier outputs; (ix) determining whether the termination probability $\epsilon$ satisfies a termination threshold; (x) in response to determining that the termination probability $\epsilon$ fails to satisfy the termination threshold, incrementing the timestamp t, for a number of training steps S: training the critic network Q according to a critic loss function that depends on the state $s_t$, the action vector $a_t$, and the reward $r_t$; and training the actor network $\pi$ according to an actor loss function that depends on an output of the critic network, and after training the actor network if and the critic network Q for the number of training steps S, returning to step (ii) with the next pair of source samples as the current pair of source samples; (xi) in response to determining that the termination probability $\epsilon$ satisfies the termination threshold, determining whether the number of training episodes executed satisfies a threshold number of training episodes; (xii) in response to determining that the number of training episodes executed fails to satisfy the threshold number of training episodes, return to step (i) to execute a next training episode; and (xiii) in response to determining that the number of training episodes executed satisfies the threshold number of training episodes, provide the machine learning classifier $\phi$.

In some non-limiting embodiments or aspects, the current pair of source samples are combined according to the composition ratio $\alpha$ to generate the labeled synthetic sample $x_{syn}$ according to the following Equations:

$$x_{syn} = \alpha * x_0 + (1-\alpha) * x_1$$

$$y_{syn} = \begin{cases} y_0, & \alpha \geq 0.5 \\ y_1, & \text{otherwise} \end{cases}.$$

where $x_0$ is a first sample of the current pair of samples, $x_1$ is a second sample of the current pair of samples, $y_{syn}$ is a hard label for the labeled synthetic sample $x_{syn}$, $y_0$ is a first hard label value, and $y_1$ is a second hard label value.

In some non-limiting embodiments or aspects, the reward $r_t$ is determined according to the following Equations:

$$\Delta M(\phi_t) = \Delta M(\phi_t(X^{val}), y^{val}) - \frac{\sum_{i=t-m}^{t-1} M(\phi_i(X^{val}), y^{val})}{m-1}$$

$$C(\phi_t \mid s_t, a_t) = \frac{1}{k}\sum_{i=0}^{k} P(y_i = 0 \mid x_i, \phi_t) P(y_i = 1 \mid x_i, \phi_t)$$

where M is an evaluation metric, $\Delta M(\phi_t)$ measures a performance improvement of the trained classifier $\phi_t$, $X^{val}$ is the validation data set, $y^{val}$ is a label set for the training data set, where $$\frac{\sum_{i=t-m}^{t-1} M(\phi_i(X^{val}), y^{val})}{m-1}$$

is a baseline for the timestamp t, m is a hyperparameter to define a buffer size for forming the baseline, C($\phi_t$|st, at) evaluates a model confidence of the trained classifier $\phi_t$, P is a model exploration function, k is the size of the nearest neighborhood specified by the action vector $a_t$, $x_i$ is a k-nearest neighborhood of the labeled synthetic sample $x_{syn}$ in timestamp t, and $y_i$ is a label for x.

In some non-limiting embodiments or aspects, the actor loss function is defined according to the following Equation:

$$L_\pi(\theta_1) = -\frac{1}{N}\sum_{i=1}^{N} Q(s_i, \pi(s_i) \mid \theta_2)$$

where N is a number of transitions, $\pi(s_i|\theta_2)$ is a projected action for a state $s_i$, and $Q(s_i, \pi(s_i)|\theta_2)$ is an output of the critic network for the projected action $\pi(s_i|\theta_2)$ and state $s_i$, and wherein the critic loss function is defined according to the following Equation:

$$L_Q(\theta_2) = [Q(s_t, a_t) - b_t]^2$$

where $b_t = R(s_t, a_t) + \gamma Q(s_{t+1}, \pi(s_{t+1}|\theta_1)|\theta_2)$, $\pi(s_{t+1}|\theta_1)$ is an action specified by the actor network, and $\gamma$ is a decade factor.

In some non-limiting embodiments or aspects, the plurality of source samples is associated with a plurality of transactions in a transaction processing network, wherein the plurality of labeled normal samples is associated with a plurality of non-fraudulent transactions of the plurality of transactions, and wherein the plurality of labeled anomaly samples is associated with a plurality of fraudulent transactions of the plurality of transactions.

In some non-limiting embodiments or aspects, the method further comprises: receiving, with the at least one processor, transaction data associated with a transaction currently being processed in the transaction processing network; processing, with the at least one processor, using the trained machine learning classifier, the transaction data to classify the transaction as a fraudulent or non-fraudulent transaction; and in response to classifying the transaction as a fraudulent transaction, denying, with the at least one processor, authorization of the transaction in the transaction processing network.

In some non-limiting embodiments or aspects, the method further comprises: before executing the training episode: training, with the at least one processor, using the training dataset $X^{train}$, the machine learning classifier $\phi$; and pre-computing, with the at least one processor, each k-nearest neighborhood for each source sample of the plurality of source samples in the training dataset $X^{train}$.

According to some non-limiting embodiments or aspects, provided is a system, comprising: at least one processor programmed and/or configured to: obtain a training dataset $X^{train}$ including a plurality of source samples including a plurality of labeled normal samples and a plurality of labeled anomaly samples; and execute a training episode by: (i) initializing a timestamp t; (ii) receiving, from an actor network $\pi$ of an actor critic framework including the actor network $\pi$ and a critic network Q, an action vector $a_t$ for the timestamp t, wherein the actor network $\pi$ is configured to generate the action vector $a_t$ based on a state $s_t$, wherein the state $s_t$ is determined based on a current pair of source samples of the plurality of source samples, and wherein the action vector $a_t$ includes a size of a nearest neighborhood k, a composition ratio $\alpha$, a number of oversampling n, and a termination probability $\epsilon$; (iii) combining the current pair of source samples according to the composition ratio $\alpha$ and the number of oversampling n to generate a labeled synthetic sample $x_{syn}$ associated with a label $y_{syn}$; (iv) training, using the labeled synthetic sample $x_{syn}$ and the label $y_{syn}$, a machine learning classifier $\phi$; (v) obtaining, based on the size of a nearest neighborhood k, source samples in the k-nearest neighborhood of the labeled synthetic sample $x_{syn}$; (vi) generating, with the machine learning classifier $\phi$, for the source samples in the k-nearest neighborhood of the labeled synthetic sample $x_{syn}$ and a subset of the plurality of source samples of the training dataset $X^{train}$ in a validation dataset $X^{val}$, a plurality of classifier outputs; (vii) selecting, from the source samples in the k-nearest neighborhood of the labeled synthetic sample $x_{syn}$, a next pair of source samples; (viii) storing, in a memory buffer, the state $s_t$, the action vector $a_t$, a next state $s_t+1$, and a reward $r_t$, wherein the next state $s_{t+1}$ is determined based on the next pair of source samples, and wherein the reward $r_t$ is determined based on the plurality of classifier outputs; (ix) determining whether the termination probability $\epsilon$ satisfies a termination threshold; (x) in response to determining that the termination probability $\epsilon$ fails to satisfy the termination threshold, incrementing the timestamp t, for a number of training steps S: training the critic network Q according to a critic loss function that depends on the state $s_t$, the action vector $a_t$, and the reward $r_t$; and training the actor network $\pi$ according to an actor loss function that depends on an output of the critic network, and after training the actor network $\pi$ and the critic network Q for the number of training steps S, returning to step (ii) with the next pair of source samples as the current pair of source samples; (xi) in response to determining that the termination probability $\epsilon$ satisfies the termination threshold, determining whether the number of training episodes executed satisfies a threshold number of training episodes; (xii) in response to determining that the number of training episodes executed fails to satisfy the threshold number of training episodes, return to step (i) to execute a next training episode; and (xiii) in response to determining that the number of training episodes executed satisfies the threshold number of training episodes, provide the machine learning classifier $\phi$.

In some non-limiting embodiments or aspects, the current pair of source samples are combined according to the composition ratio $\alpha$ to generate the labeled synthetic sample $x_{syn}$ according to the following Equations:

$$x_{syn} = \alpha * x_0 + (1-\alpha) * x_1$$

$$y_{syn} = \begin{cases} y_0, & \alpha \geq 0.5 \\ y_1, & \text{otherwise} \end{cases}.$$

where $x_0$ is a first sample of the current pair of samples, $x_i$ is a second sample of the current pair of samples, $y_{syn}$ is a hard label for the labeled synthetic sample $x_{syn}$, $y_0$ is a first hard label value, and $y_1$ is a second hard label value.

In some non-limiting embodiments or aspects, the reward $r_t$ is determined according to the following Equations:

$$\Delta M(\phi_t) = \Delta M(\phi_t(X^{val}), y^{val}) - \frac{\sum_{i=t-m}^{t-1} M(\phi_i(X^{val}), y^{val})}{m-1}$$

$$C(\phi_t \mid s_t, a_t) = \frac{1}{k}\sum_{i=0}^{k} P(y_i = 0 \mid x_i, \phi_t) P(y_i = 1 \mid x_i, \phi_t)$$

where M is an evaluation metric, $\Delta M(\phi_t)$ measures a performance improvement of the trained classifier $\phi_t$, $X^{val}$ is the validation data set, $y^{val}$ is a label set for the training data set, where $$\frac{\sum_{i=t-m}^{t-1} M(\phi_i(X^{val}), y^{val})}{m-1}$$

is a baseline for the timestamp t, m is a hyperparameter to define a buffer size for forming the baseline, $C(\phi_t|\text{st}, \text{at})$ evaluates a model confidence of the trained classifier $\phi_t$, P is a model exploration function, k is the size of the nearest neighborhood specified by the action vector $a_t$, $x_i$ is a k-nearest neighborhood of the labeled synthetic sample $x_{syn}$ in timestamp t, and $y_i$ is a label for x.

In some non-limiting embodiments or aspects, the actor loss function is defined according to the following Equation:

$$L_\pi(\theta_1) = -\frac{1}{N}\sum_{i=1}^{N} Q(s_i, \pi(s_i) | \theta_2)$$

where N is a number of transitions, $\pi(s_i|\theta_2)$ is a projected action for a state $s_i$, and $Q(s_i, \pi(s_i)\theta_2)$ is an output of the critic network for the projected action $\pi(s_i|\theta_2)$ and state $s_i$, and wherein the critic loss function is defined according to the following Equation:

$$L_Q(\theta_2) = [Q(s_t, a_t) - b_t]^2$$

where $b_t = R(s_t, a_t) + \gamma Q(s_{t+1}, \pi(s_{t+1}|\theta_1|\theta_2)$, $\pi(s_{t+1}|\theta_1)$ is an action specified by the actor network, and $\gamma$ is a decade factor.

In some non-limiting embodiments or aspects, the plurality of source samples is associated with a plurality of transactions in a transaction processing network, wherein the plurality of labeled normal samples is associated with a plurality of non-fraudulent transactions of the plurality of transactions, and wherein the plurality of labeled anomaly samples is associated with a plurality of fraudulent transactions of the plurality of transactions.

In some non-limiting embodiments or aspects, the at least one processor is further programmed and/or configured to: receive transaction data associated with a transaction currently being processed in the transaction processing network; process, using the trained machine learning classifier, the transaction data to classify the transaction as a fraudulent or non-fraudulent transaction; and in response to classifying the transaction as a fraudulent transaction, deny authorization of the transaction in the transaction processing network.

In some non-limiting embodiments or aspects, the at least one processor is further programmed and/or configured to: before executing the training episode: train, using the training dataset $X^{train}$, the machine learning classifier $\phi$; and pre-compute each k-nearest neighborhood for each source sample of the plurality of source samples in the training dataset $X^{train}$.

According to some non-limiting embodiments or aspects, provided is a computer program product including a non-transitory computer readable medium including program instructions which, when executed by at least one processor, cause the at least one processor to: obtain a training dataset $X^{train}$ including a plurality of source samples including a plurality of labeled normal samples and a plurality of labeled anomaly samples; and execute a training episode by: (i) initializing a timestamp t; (ii) receiving, from an actor network $\pi$ of an actor critic framework including the actor network $\pi$ and a critic network Q, an action vector $a_t$ for the timestamp t, wherein the actor network $\pi$ is configured to generate the action vector $a_t$ based on a state $s_t$, wherein the state $s_t$ is determined based on a current pair of source samples of the plurality of source samples, and wherein the action vector $a_t$ includes a size of a nearest neighborhood k, a composition ratio $\alpha$, a number of oversampling n, and a termination probability $\in$; (iii) combining the current pair of source samples according to the composition ratio $\alpha$ and the number of oversampling n to generate a labeled synthetic sample $x_{syn}$ associated with a label $y_{syn}$; (iv) training, using the labeled synthetic sample $x_{syn}$ and the label $y_{syn}$, a machine learning classifier $\phi$; (v) obtaining, based on the size of a nearest neighborhood k, source samples in the k-nearest neighborhood of the labeled synthetic sample $x_{syn}$; (vi) generating, with the machine learning classifier $\phi$, for the source samples in the k-nearest neighborhood of the labeled synthetic sample $x_{syn}$ and a subset of the plurality of source samples of the training dataset $X^{train}$ in a validation dataset $X^{val}$, a plurality of classifier outputs; (vii) selecting, from the source samples in the k-nearest neighborhood of the labeled synthetic sample $x_{syn}$, a next pair of source samples; (viii) storing, in a memory buffer, the state $s_t$, the action vector $a_t$, a next state $s_{t+1}$, and a reward $r_t$, wherein the next state $s_{t+1}$ is determined based on the next pair of source samples, and wherein the reward $r_t$ is determined based on the plurality of classifier outputs; (ix) determining whether the termination probability $\in$ satisfies a termination threshold; (x) in response to determining that the termination probability $\in$ fails to satisfy the termination threshold, incrementing the timestamp t, for a number of training steps S: training the critic network Q according to a critic loss function that depends on the state $s_t$, the action vector $a_t$, and the reward $r_t$; and training the actor network $\pi$ according to an actor loss function that depends on an output of the critic network, and after training the actor network $\pi$ and the critic network Q for the number of training steps S, returning to step (ii) with the next pair of source samples as the current pair of source samples; ($x_1$) in response to determining that the termination probability $\in$ satisfies the termination threshold, determining whether the number of training episodes executed satisfies a threshold number of training episodes; (xii) in response to determining that the number of training episodes executed fails to satisfy the threshold number of training episodes, return to step (i) to execute a next training episode; and (xiii) in response to determining that the number of training episodes executed satisfies the threshold number of training episodes, provide the machine learning classifier $\phi$.

In some non-limiting embodiments or aspects, the current pair of source samples are combined according to the composition ratio $\alpha$ to generate the labeled synthetic sample $x_{syn}$ according to the following Equations:

$$x_{syn} = \alpha * x_0 + (1-\alpha) * x_1$$

$$y_{syn} = \begin{cases} y_0, & \alpha \geq 0.5 \\ y_1, & \text{otherwise} \end{cases}.$$

where $x_0$ is a first sample of the current pair of samples, $x_i$ is a second sample of the current pair of samples, $y_{syn}$ is a hard label for the labeled synthetic sample $x_{syn}$, $y_0$ is a first hard label value, and $y_1$ is a second hard label value.

In some non-limiting embodiments or aspects, the reward $r_t$ is determined according to the following Equations:

$$\Delta M(\phi_t) = \Delta M(\phi_t(X^{val}), y^{val}) - \frac{\sum_{i=t-m}^{t-1} M(\phi_i(X^{val}), y^{val})}{m-1}$$

$$C(\phi_t \mid s_t, a_t) = \frac{1}{k}\sum_{i=0}^{k} P(y_i = 0 \mid x_i, \phi_t)P(y_i = 1 \mid x_i, \phi_t)$$

where M is an evaluation metric, $\Delta M(\phi_t)$ measures a performance improvement of the trained classifier $\phi_t$, $X^{val}$ is the validation data set, $y^{val}$ is a label set for the training data set, where $$\frac{\sum_{i=t-m}^{t-1} M(\phi_i(X^{val}), y^{val})}{m-1}$$

is a baseline for the timestamp t, m is a hyperparameter to define a buffer size for forming the baseline, $C(\phi t|st, at)$ evaluates a model confidence of the trained classifier $\phi_t$, P is a model exploration function, k is the size of the nearest neighborhood specified by the action vector $a_t$, $x_i$ is a k-nearest neighborhood of the labeled synthetic sample $x_{syn}$ in timestamp t, and $y_i$ is a label for x.

In some non-limiting embodiments or aspects, the actor loss function is defined according to the following Equation:

$$L_\pi(\theta_1) = -\frac{1}{N}\sum_{i=1}^{N} Q(s_i, \pi(s_i) \mid \theta_2)$$

where N is a number of transitions, $\pi(s_i|\theta_2)$ is a projected action for a state $s_i$, and $Q(s_i, \pi(s_i)|\theta_2)$ is an output of the critic network for the projected action $\pi(s_i|\theta_2)$ and state $s_i$, and wherein the critic loss function is defined according to the following Equation:

$$L_Q(\theta_2) = [Q(s_t, a_t) - b_t]^2$$

where $b_t = R(s_t, a_t) + \gamma Q(s_{t+1}, \pi(s_{t+1}|\theta_1) \theta_2)$, $\pi(s_{t+1}|\theta_1)$ is an action specified by the actor network, and $\gamma$ is a decade factor.

In some non-limiting embodiments or aspects, the plurality of source samples is associated with a plurality of transactions in a transaction processing network, wherein the plurality of labeled normal samples is associated with a plurality of non-fraudulent transactions of the plurality of transactions, and wherein the plurality of labeled anomaly samples is associated with a plurality of fraudulent transactions of the plurality of transactions.

In some non-limiting embodiments or aspects, the program instructions, when executed by at least one processor, further cause the at least one processor to: receive transaction data associated with a transaction currently being processed in the transaction processing network; process, using the trained machine learning classifier, the transaction data to classify the transaction as a fraudulent or non-fraudulent transaction; and in response to classifying the transaction as a fraudulent transaction, deny authorization of the transaction in the transaction processing network.

In some non-limiting embodiments or aspects, the program instructions, when executed by at least one processor, further cause the at least one processor to: before executing the training episode: train, using the training dataset $X^{train}$, the machine learning classifier $\phi$; and pre-compute, each k-nearest neighborhood for each source sample of the plurality of source samples in the training dataset $X^{train}$.

Further non-limiting embodiments or aspects are set forth in the following numbered clauses:

Clause 1: A method, comprising: obtaining, with at least one processor, a training dataset $X^{train}$ including a plurality of source samples including a plurality of labeled normal samples and a plurality of labeled anomaly samples; and executing, with the at least one processor, a training episode by: (i) initializing a timestamp t; (ii) receiving, from an actor network $\pi$ of an actor critic framework including the actor network $\pi$ and a critic network Q, an action vector $a_t$ for the timestamp t, wherein the actor network $\pi$ is configured to generate the action vector $a_t$ based on a state $s_t$, wherein the state $s_t$ is determined based on a current pair of source samples of the plurality of source samples, and wherein the action vector $a_t$ includes a size of a nearest neighborhood k, a composition ratio $\alpha$, a number of oversampling n, and a termination probability $\in$; (iii) combining the current pair of source samples according to the composition ratio $\alpha$ and the number of oversampling n to generate a labeled synthetic sample $x_{syn}$ associated with a label $y_{syn}$; (iv) training, using the labeled synthetic sample $x_{syn}$ and the label $y_{syn}$, a machine learning classifier $\phi$; (v) obtaining, based on the size of a nearest neighborhood k, source samples in the k-nearest neighborhood of the labeled synthetic sample $x_{syn}$; (vi) generating, with the machine learning classifier $\phi$, for the source samples in the k-nearest neighborhood of the labeled synthetic sample $x_{syn}$ and a subset of the plurality of source samples of the training dataset $X^{train}$ in a validation dataset $X^{val}$, a plurality of classifier outputs; (vii) selecting, from the source samples in the k-nearest neighborhood of the labeled synthetic sample $x_{syn}$, a next pair of source samples; (viii) storing, in a memory buffer, the state $s_t$, the action vector $a_t$, a next state $s_t+1$, and a reward $r_t$, wherein the next state $s_{t+1}$ is determined based on the next pair of source samples, and wherein the reward $r_t$ is determined based on the plurality of classifier outputs; (ix) determining whether the termination probability $\in$ satisfies a termination threshold; (x) in response to determining that the termination probability $\in$ fails to satisfy the termination threshold, incrementing the timestamp t, for a number of training steps S: training the critic network Q according to a critic loss function that depends on the state $s_t$, the action vector $a_t$, and the reward $r_t$; and training the actor network $\pi$ according to an actor loss function that depends on an output of the critic network, and after training the actor network $\pi$ and the critic network Q for the number of training steps S, returning to step (ii) with the next pair of source samples as the current pair of source samples; ($x_1$) in response to determining that the termination probability $\in$ satisfies the termination threshold, determining whether the number of training episodes executed satisfies a threshold number of training episodes; (xii) in response to determining that the number of training episodes executed fails to satisfy the threshold number of training episodes, return to step (i) to execute a next training episode; and (xiii) in response to determining that the number of training episodes executed satisfies the threshold number of training episodes, provide the machine learning classifier $\phi$.

Clause 2: The method of clause 1, wherein the current pair of source samples are combined according to the composition ratio α to generate the labeled synthetic sample $x_{syn}$ according to the following Equations:

$$x_{syn} = \alpha * x_0 + (1-\alpha) * x_1$$

$$y_{syn} = \begin{cases} y_0, & \alpha \geq 0.5 \\ y_1, & \text{otherwise} \end{cases}.$$

where $x_0$ is a first sample of the current pair of samples, $x_i$ is a second sample of the current pair of samples, $y_{syn}$ is a hard label for the labeled synthetic sample $x_{syn}$, $y_0$ is a first hard label value, and $y_1$ is a second hard label value.

Clause 3: The method of clauses 1 or 2, wherein the reward $r_t$ is determined according to the following Equations:

$$\Delta M(\phi_t) = M(\phi_t(X^{val}), y^{val}) - \frac{\sum_{i=t-m}^{t-1} M(\phi_i(X^{val}), y^{val})}{m-1}.$$

$$C(\phi_t \mid s_t, a_t) = \frac{1}{k}\sum_{i=0}^{k} P(y_i = 0 \mid x_i, \phi_t) P(y_i = 1 \mid x_i, \phi_t)$$

where M is an evaluation metric, $\Delta M(\phi_t)$ measures a performance improvement of the trained classifier $\phi_t$, $X^{val}$ is the validation data set, $y^{val}$ is a label set for the training data set, where $$\frac{\sum_{i=t-m}^{t-1} M(\phi_i(X^{val}), y^{val})}{m-1}$$

is a baseline for the timestamp t, m is a hyperparameter to define a buffer size for forming the baseline, $C(\phi_t|st, at)$ evaluates a model confidence of the trained classifier $\phi_t$, P is a model exploration function, k is the size of the nearest neighborhood specified by the action vector $a_t$, $x_i$ is a k-nearest neighborhood of the labeled synthetic sample $x_{syn}$ in timestamp t, and $y_i$ is a label for x.

Clause 4: The method of any of clauses 1-3, wherein the actor loss function is defined according to the following Equation:

$$L_\pi(\theta_1) = -\frac{1}{N}\sum_{i=1}^{N} Q(s_i, \pi(s_i) \mid \theta_2)$$

where N is a number of transitions, $\pi(s_i|\theta_2)$ is a projected action for a state $s_i$, and $Q(s_i, \pi(s_i)|\theta_2)$ is an output of the critic network for the projected action $\pi(s_i|\theta_2)$ and state $s_i$, and wherein the critic loss function is defined according to the following Equation:

$$L_Q(\theta_2) = [Q(s_t, a_t) - b_t]^2$$

where $b_t = R(s_t, a_t) + \gamma Q(s_{t+1}, \pi(s_{t+1}|\theta_1)|\theta_2)$, $\pi(s_{t+1|01})$ is an action specified by the actor network, and γ is a decade factor.

Clause 5: The method of any of clauses 1-4, wherein the plurality of source samples is associated with a plurality of transactions in a transaction processing network, wherein the plurality of labeled normal samples is associated with a plurality of non-fraudulent transactions of the plurality of transactions, and wherein the plurality of labeled anomaly samples is associated with a plurality of fraudulent transactions of the plurality of transactions.

Clause 6: The method of any of clauses 1-5, further comprising: receiving, with the at least one processor, transaction data associated with a transaction currently being processed in the transaction processing network; processing, with the at least one processor, using the trained machine learning classifier, the transaction data to classify the transaction as a fraudulent or non-fraudulent transaction; and in response to classifying the transaction as a fraudulent transaction, denying, with the at least one processor, authorization of the transaction in the transaction processing network.

Clause 7: The method of any of clauses 1-6, further comprising: before executing the training episode: training, with the at least one processor, using the training dataset $X^{train}$, the machine learning classifier $\phi$; and pre-computing, with the at least one processor, each k-nearest neighborhood for each source sample of the plurality of source samples in the training dataset $X^{train}$.

Clause 8: A system, comprising: at least one processor programmed and/or configured to: obtain a training dataset $X^{train}$ including a plurality of source samples including a plurality of labeled normal samples and a plurality of labeled anomaly samples; and execute a training episode by: (i) initializing a timestamp t; (ii) receiving, from an actor network π of an actor critic framework including the actor network π and a critic network Q, an action vector $a_t$ for the timestamp t, wherein the actor network π is configured to generate the action vector $a_t$ based on a state $s_t$, wherein the state $s_t$ is determined based on a current pair of source samples of the plurality of source samples, and wherein the action vector $a_t$ includes a size of a nearest neighborhood k, a composition ratio α, a number of oversampling n, and a termination probability $\epsilon$; (iii) combining the current pair of source samples according to the composition ratio α and the number of oversampling n to generate a labeled synthetic sample $x_{syn}$ associated with a label $y_{syn}$; (iv) training, using the labeled synthetic sample $x_{syn}$ and the label $y_{syn}$, a machine learning classifier $\phi$; (v) obtaining, based on the size of a nearest neighborhood k, source samples in the k-nearest neighborhood of the labeled synthetic sample $x_{syn}$; (vi) generating, with the machine learning classifier $\phi$, for the source samples in the k-nearest neighborhood of the labeled synthetic sample $x_{syn}$ and a subset of the plurality of source samples of the training dataset $X^{train}$ in a validation dataset $X^{val}$, a plurality of classifier outputs; (vii) selecting, from the source samples in the k-nearest neighborhood of the labeled synthetic sample $x_{syn}$, a next pair of source samples; (viii) storing, in a memory buffer, the state $s_t$, the action vector $a_t$, a next state $s_t+1$, and a reward $r_t$, wherein the next state $s_{t+1}$ is determined based on the next pair of source samples, and wherein the reward $r_t$ is determined based on the plurality of classifier outputs; (ix) determining whether the termination probability $\epsilon$ satisfies a termination threshold; (x) in response to determining that the termination probability $\epsilon$ fails to satisfy the termination threshold, incrementing the timestamp t, for a number of training steps S: training the critic network Q according to a critic loss function that depends on the state $s_t$, the action vector $a_t$, and the reward $r_t$; and training the actor network π according to an actor loss function that depends on an output of the critic network, and after training the actor network π and the critic network Q for the number of training steps S, returning to step (ii) with the next pair of source samples as the current pair of source samples; ($x_1$) in response to determining that the termination probability $\epsilon$ satisfies the termination threshold, determining whether the number of training episodes executed satisfies a threshold number of training episodes; (xii) in response to determining that the number of training episodes executed fails to satisfy the threshold number of training episodes, return to step (i) to execute a next training episode; and (xiii) in response to determining that the number of training episodes executed satisfies the threshold number of training episodes, provide the machine learning classifier $\phi$.

Clause 9: The system of clause 8, wherein the current pair of source samples are combined according to the composition ratio $\alpha$ to generate the labeled synthetic sample $x_{syn}$ according to the following Equations:

$$x_{syn} = \alpha x_0 + (1-\alpha)*x_1$$

$$y_{syn} = \begin{cases} y_0, & \alpha \geq 0.5 \\ y_1, & \text{otherwise} \end{cases}.$$

where $x_0$ is a first sample of the current pair of samples, $x_i$ is a second sample of the current pair of samples, $y_{syn}$ is a hard label for the labeled synthetic sample $x_{syn}$, $y_0$ is a first hard label value, and $y_1$ is a second hard label value.

Clause 10: The system of clauses 8 or 9, wherein the reward $r_t$ is determined according to the following Equations:

$$\Delta \mathcal{M}(\phi_t) = \mathcal{M}(\phi_t(X^{val}), y^{val}) - \frac{\sum_{i=t-m}^{t-1} \mathcal{M}(\phi_i(X^{val}), y^{val})}{m-1}.$$

$$C(\phi_t \mid s_t, a_t) = \frac{1}{k} \sum_{i=0}^{k} P(y_i = 0 \mid x_i, \phi_t) P(y_i = 1 \mid x_i, \phi_t)$$

where $\mathcal{M}$ is an evaluation metric, $\Delta \mathcal{M}(\phi_t)$ measures a performance improvement of the trained classifier $\phi_t$, $X^{val}$ is the validation data set, $y^{val}$ is a label set for the training data set, where $$\frac{\sum_{i=t-m}^{t-1} \mathcal{M}(\phi_i(X^{val}), y^{val})}{m-1}$$

is a baseline for the timestamp t, m is a hyperparameter to define a buffer size for forming the baseline, $C(\phi_t|st, at)$ evaluates a model confidence of the trained classifier $\phi_t$, P is a model exploration function, k is the size of the nearest neighborhood specified by the action vector $a_t$, $x_i$ is a k-nearest neighborhood of the labeled synthetic sample $x_{syn}$ in timestamp t, and $y_1$ is a label for x.

Clause 11: The system of any of clauses 8-10, wherein the actor loss function is defined according to the following Equation:

$$L_\pi(\theta_1) = -\frac{1}{N} \sum_{i=1}^{N} Q(s_i, \pi(s_i) \mid \theta_2)$$

where N is a number of transitions, $\pi(s_i|\theta_2)$ is a projected action for a state $s_i$, and $Q(s_i, \pi(s_i)|\theta_2)$ is an output of the critic network for the projected action $\pi(s_i|\theta_2)$ and state $s_i$, and wherein the critic loss function is defined according to the following Equation:

$$L_Q(\theta_2) = [Q(s_t, a_t) - b_t]^2$$

where $b_t = R(s_t, a_t) + \gamma Q(s_{t+1}, \pi(s_{t+1}|\theta_1)|\theta_2)$, $\pi(s_{t+1}|\theta_1)$ is an action specified by the actor network, and $\gamma$ is a decade factor.

Clause 12: The system of any of clauses 8-11, wherein the plurality of source samples is associated with a plurality of transactions in a transaction processing network, wherein the plurality of labeled normal samples is associated with a plurality of non-fraudulent transactions of the plurality of transactions, and wherein the plurality of labeled anomaly samples is associated with a plurality of fraudulent transactions of the plurality of transactions.

Clause 13: The system of any of clauses 8-12, wherein the at least one processor is further programmed and/or configured to: receive transaction data associated with a transaction currently being processed in the transaction processing network; process, using the trained machine learning classifier, the transaction data to classify the transaction as a fraudulent or non-fraudulent transaction; and in response to classifying the transaction as a fraudulent transaction, deny authorization of the transaction in the transaction processing network.

Clause 14: The system of any of clauses 8-13, wherein the at least one processor is further programmed and/or configured to: before executing the training episode: train, using the training dataset $X^{train}$, the machine learning classifier $\phi$; and pre-compute each k-nearest neighborhood for each source sample of the plurality of source samples in the training dataset $X^{train}$.

Clause 15: A computer program product including a non-transitory computer readable medium including program instructions which, when executed by at least one processor, cause the at least one processor to: obtain a training dataset $X^{train}$ including a plurality of source samples including a plurality of labeled normal samples and a plurality of labeled anomaly samples; and execute a training episode by: (i) initializing a timestamp t; (ii) receiving, from an actor network $\pi$ of an actor critic framework including the actor network $\pi$ and a critic network Q, an action vector $a_t$ for the timestamp t, wherein the actor network $\pi$ is configured to generate the action vector $a_t$ based on a state $s_t$, wherein the state $s_t$ is determined based on a current pair of source samples of the plurality of source samples, and wherein the action vector $a_t$ includes a size of a nearest neighborhood k, a composition ratio $\alpha$, a number of oversampling n, and a termination probability $\in$; (iii) combining the current pair of source samples according to the composition ratio $\alpha$ and the number of oversampling n to generate a labeled synthetic sample $x_{syn}$ associated with a label $y_{syn}$; (iv) training, using the labeled synthetic sample $x_{syn}$ and the label $y_{syn}$, a machine learning classifier $\phi$; (v) obtaining, based on the size of a nearest neighborhood k, source samples in the k-nearest neighborhood of the labeled synthetic sample $x_{syn}$; (vi) generating, with the machine learning classifier $\phi$, for the source samples in the k-nearest neighborhood of the labeled synthetic sample $x_{syn}$ and a subset of the plurality of source samples of the training dataset $X^{train}$ in a validation dataset $X^{val}$, a plurality of classifier outputs; (vii) selecting, from the source samples in the k-nearest neighborhood of the labeled synthetic sample $x_{syn}$, a next pair of source samples; (viii) storing, in a memory buffer, the state $s_t$, the action vector $a_t$, a next state $s_t+1$, and a reward $r_t$, wherein the next state $s_{t+1}$ is determined based on the next pair of source samples, and wherein the reward $r_t$ is determined based on the plurality of classifier outputs; (ix) determining whether the termination probability $\epsilon$ satisfies a termination threshold; (x) in response to determining that the termination probability $\epsilon$ fails to satisfy the termination threshold, incrementing the timestamp t, for a number of training steps S: training the critic network Q according to a critic loss function that depends on the state $s_t$, the action vector $a_t$, and the reward $r_t$; and training the actor network $\pi$ according to an actor loss function that depends on an output of the critic network, and after training the actor network $\pi$ and the critic network Q for the number of training steps S, returning to step (ii) with the next pair of source samples as the current pair of source samples; ($x_1$) in response to determining that the termination probability $\epsilon$ satisfies the termination threshold, determining whether the number of training episodes executed satisfies a threshold number of training episodes; (xii) in response to determining that the number of training episodes executed fails to satisfy the threshold number of training episodes, return to step (i) to execute a next training episode; and (xiii) in response to determining that the number of training episodes executed satisfies the threshold number of training episodes, provide the machine learning classifier $\phi$.

Clause 16: The computer program product of clause 15, wherein the current pair of source samples are combined according to the composition ratio $\alpha$ to generate the labeled synthetic sample $x_{syn}$ according to the following Equations:

$$x_{syn} = \alpha * x_0 + (1-\alpha) * x_1$$

$$y_{syn} = \begin{cases} y_0, & \alpha \geq 0.5 \\ y_1, & \text{otherwise} \end{cases}.$$

where $x_0$ is a first sample of the current pair of samples, $x_i$ is a second sample of the current pair of samples, $y_{syn}$ is a hard label for the labeled synthetic sample $x_{syn}$, $y_0$ is a first hard label value, and $y_1$ is a second hard label value.

Clause 17: The computer program product of clauses 15 or 16, wherein the reward $r_t$ is determined according to the following Equations:

$$\Delta M(\phi_t) = M(\phi_t(X^{val}), y^{val}) - \frac{\sum_{i=t-m}^{t-1} M(\phi_i(X^{val}), y^{val})}{m-1}.$$

$$C(\phi_t \mid s_t, a_t) = \frac{1}{k} \sum_{i=0}^{k} P(y_i = 0 \mid x_i, \phi_t) P(y_i = 1 \mid x_i, \phi_t)$$

where M is an evaluation metric, $\Delta M(\phi_t)$ measures a performance improvement of the trained classifier $\phi_t$, $X^{val}$ is the validation data set, $y^{val}$ is a label set for the training data set, where $$\frac{\sum_{i=t-m}^{t-1} M(\phi_i(X^{val}), y^{val})}{m-1}$$

is a baseline for the timestamp t, m is a hyperparameter to define a buffer size for forming the baseline, $C(\phi_t|st, at)$ evaluates a model confidence of the trained classifier $\phi_t$, P is a model exploration function, k is the size of the nearest neighborhood specified by the action vector $a_t$, $x_i$ is a k-nearest neighborhood of the labeled synthetic sample $x_{syn}$ in timestamp t, and $y_i$ is a label for x.

Clause 18: The computer program product of any of clauses 15-17, wherein the actor loss function is defined according to the following Equation:

$$L_\pi(\theta_1) = -\frac{1}{N} \sum_{i=1}^{N} Q(s_i, \pi(s_i) \mid \theta_2)$$

where N is a number of transitions, $\pi(s_i|\theta_2)$ is a projected action for a state $s_i$, and $Q(s_i, \pi(s_i)|\theta_2)$ is an output of the critic network for the projected action $\pi(s_i|\theta_2)$ and state $s_i$, and wherein the critic loss function is defined according to the following Equation:

$$L_Q(\theta_2) = [Q(s_t, a_t) - b_t]^2$$

where $b_t = R(s_t, a_t) + \gamma Q(s_{t+1}, \pi(s_{t+1}|\theta_1)|\theta_2)$, $\pi(s_{t+1}|\theta_1)$ is an action specified by the actor network, and $\gamma$ is a decade factor.

Clause 19: The computer program product of any of clauses 15-18, wherein the plurality of source samples is associated with a plurality of transactions in a transaction processing network, wherein the plurality of labeled normal samples is associated with a plurality of non-fraudulent transactions of the plurality of transactions, and wherein the plurality of labeled anomaly samples is associated with a plurality of fraudulent transactions of the plurality of transactions.

Clause 20: The computer program product of any of clauses 15-19, wherein the program instructions, when executed by at least one processor, further cause the at least one processor to: receive transaction data associated with a transaction currently being processed in the transaction processing network; process, using the trained machine learning classifier, the transaction data to classify the transaction as a fraudulent or non-fraudulent transaction; and in response to classifying the transaction as a fraudulent transaction, deny authorization of the transaction in the transaction processing network.

Clause 21: The computer program product of any of clauses 15-20, wherein the program instructions, when executed by at least one processor, further cause the at least one processor to: before executing the training episode: train, using the training dataset $X^{train}$, the machine learning classifier $\phi$; and pre-compute, each k-nearest neighborhood for each source sample of the plurality of source samples in the training dataset $X^{train}$.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS AND APPENDICES

Additional advantages and details are explained in greater detail below with reference to the exemplary embodiments that are illustrated in the accompanying schematic figures, in which:

FIG. 7 illustrates an implementation of non-limiting embodiments or aspects of a training procedure of a process for synthetic oversampling for boosting supervised anomaly detection;

FIG. 8 is a table summarizing statistics of datasets;

FIG. 9 is a table summarizing a horizontal comparison between a framework according to non-limiting embodiments or aspects of the present disclosure and representative data augmentation methods;

FIG. 10 is a table summarizing a vertical comparison between a framework according to non-limiting embodiments or aspects of the present disclosure and label-informed detection algorithms; and FIG. 11 a table of macro-averaged scores of a framework according to non-limiting embodiments or aspects of the present disclosure.

DETAILED DESCRIPTION

Figure 1:
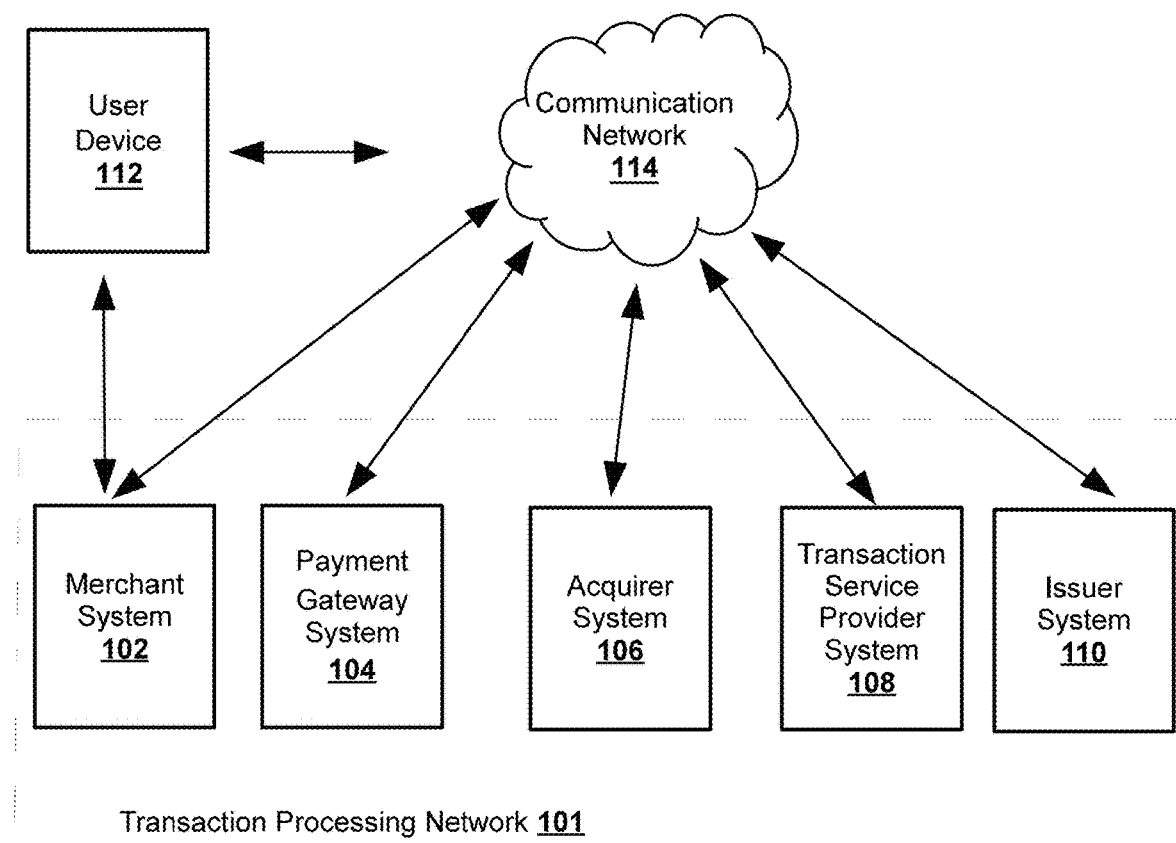
FIG. 1 is a diagram of non-limiting embodiments or aspects of an environment in which systems, devices, products, apparatus, and/or methods, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature.

Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computing devices operated by or on behalf of a transaction service provider, such as a transaction processing server executing one or more software applications. A transaction processing system may include one or more processors and, in some non-limiting embodiments, may be operated by or on behalf of a transaction service provider.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the terms "issuer institution," "portable financial device issuer," "issuer," or "issuer bank" may refer to one or more entities that provide one or more accounts to a user (e.g., a customer, a consumer, an entity, an organization, and/or the like) for conducting transactions (e.g., payment transactions), such as initiating credit card payment transactions and/or debit card payment transactions. For example, an issuer institution may provide an account identifier, such as a PAN, to a user that uniquely identifies one or more accounts associated with that user. The account identifier may be embodied on a portable financial device, such as a physical financial instrument (e.g., a payment card), and/or may be electronic and used for electronic payments. In some non-limiting embodiments or aspects, an issuer institution may be associated with a bank identification number (BIN) that uniquely identifies the issuer institution. As used herein, the term "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "merchant" may refer to an individual or entity that provides goods and/or services, or access to goods and/or services, to users (e.g. customers) based on a transaction (e.g. a payment transaction). As used herein, the terms "merchant" or "merchant system" may also refer to one or more computer systems, computing devices, and/or software application operated by or on behalf of a merchant, such as a server computer executing one or more software applications. A "point-of-sale (POS) system," as used herein, may refer to one or more computers and/or peripheral devices used by a merchant to engage in payment transactions with users, including one or more card readers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction. A POS system may be part of a merchant system. A merchant system may also include a merchant plug-in for facilitating online, Internet-based transactions through a merchant webpage or software application. A merchant plug-in may include software that runs on a merchant server or is hosted by a third-party for facilitating such online transactions.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. A computing device may also be a desktop computer or other form of non-mobile computer. The term "configured to," as used herein, may refer to an arrangement of software, device(s), and/or hardware for performing and/or enabling one or more functions (e.g., actions, processes, steps of a process, and/or the like). For example, "a processor configured to" may refer to a processor that executes software instructions (e.g., program code) that cause the processor to perform one or more functions.

As used herein, the term "payment device" may refer to a portable financial device, an electronic payment device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computer, an access card, a wireless terminal, a transponder, and/or the like. In some non-limiting embodiments or aspects, the payment device may include volatile or nonvolatile memory to store information (e.g., an account identifier, a name of the account holder, and/or the like).

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

As used herein, the term "acquirer" may refer to an entity licensed by the transaction service provider and/or approved by the transaction service provider to originate transactions using a portable financial device of the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the terms "authenticating system" and "authentication system" may refer to one or more computing devices that authenticate a user and/or an account, such as but not limited to a transaction processing system, merchant system, issuer system, payment gateway, a third-party authenticating service, and/or the like.

As used herein, the terms "request," "response," "request message," and "response message" may refer to one or more messages, data packets, signals, and/or data structures used to communicate data between two or more components or units.

As used herein, the term "application programming interface" (API) may refer to computer code that allows communication between different systems or (hardware and/or software) components of systems. For example, an API may include function calls, functions, subroutines, communication protocols, fields, and/or the like usable and/or accessible by other systems or other (hardware and/or software) components of systems.

As used herein, the term "user interface" or "graphical user interface" refers to a generated display, such as one or more graphical user interfaces (GUIs) with which a user may interact, either directly or indirectly (e.g., through a keyboard, mouse, touchscreen, etc.).

Anomaly detection is widely adopted in a broad range of domains, such as intrusion detection in cybersecurity, fault detection in manufacturing, and fraud detection in finance. Anomalies in data often come from diverse factors, resulting in diverse behaviors of anomalies with distinctly dissimilar features. For example, different fraudulent transactions can embody entirely dissimilar behaviors. By definition, anomalies often occur rarely, and unpredictably, in a dataset. Therefore, it is difficult, if not impossible, to obtain well-labeled training data. For example, given a set of transactions, distinguishing fraudulent transactions from normal transactions costs much less effort than categorizing the fraudulent transactions, especially when there is no clear definition of the behavior categories. This often results in diverse semantic meanings for a limited amount of single-type label information and is thus unsuitable for supervised training of an anomaly detector.

Still, label information plays a significant role in enhancing detection performance. To better exploit sparse label information, existing efforts focus on weakly/semi-supervised learning and data augmentation to overcome the label sparsity issue. Weakly/semi-supervised learning methods seek to extract extra information from the given labels with tailored loss functions or scoring functions. Though weakly/semi-supervised learning is capable of capturing label information, weakly/semi-supervised learning focus on learning the knowledge from limited anomaly samples and therefore ignore the supervisory signals of possible anomalies in the unlabeled data. To overcome this limitation, some data augmentation approaches focus on synthetic oversampling to synthesize minority classes (e.g., anomalies) to create a balanced dataset for training supervised classifiers. However, the behaviors of anomalies are diverse, and synthesizing anomalies based on two arbitrary anomalies may introduce noise into the training dataset.

For example, there are mainly two existing strategies to exploit limited label information for anomaly detection problems: label-informed anomaly detection and data augmentation.

Weakly/semi-supervised anomaly detection are the two main existing strategies to tackle the problem under the scenario of either labeled normal or anomaly samples are accessible. To leverage the large number of labeled normal samples, SAnDCat selects top-K representative samples from the dataset as a reference for evaluating anomaly scores based on a model learned from pairwise distances between labeled normal instances. On the other hand, to exploit a limited number of labeled anomalies, DevNet enforces the anomaly scores of individual data instances to fit a one-sided Gaussian distribution for leveraging prior knowledge of labeled normal samples and anomalies. PRO introduces a two-stream ordinal-regression network to learn the pair-wise relations between two data samples, which is assumption-free on the probability distribution of the anomaly scores.

Recently, several endeavors further generalize the label-informed anomaly detection problem into semi-supervised classification setting that both limited numbers of normal and anomaly samples are accessible. The main underlying assumptions assume that similar points are likely to be of the same class and are therefore densely distributed within the same high-density region of a low-dimensional feature space. XGBOD extracts feature representation based on the anomaly score of multiple unsupervised anomaly detectors for training a supervised gradient boosting tree classifier. DeepSAD points out the semi-supervision assumptions only work for normal samples and further develops a one-class classification framework to cluster labeled normal samples while maximizing the distance between the labeled anomalies and the cluster in the high-dimensional space. However, weakly/semi-supervised learning methods focus on modeling the given label information without considering the relations between two labeled instances. Therefore, it is infeasible to generalize the label information when anomaly behaviors are diverse. By considering correlations between labeled samples and generating beneficial training data correspondingly, non-limiting embodiments or aspects of the present disclosure may be able to generalize the label information for training arbitrary classifiers.

Data augmentation has been extensively studied for a wide range of data types to enlarge training data size and generalize model decision boundaries for improving performance and robustness. To tackle the imbalanced classification problem, there are mainly two different categories: algorithm-wise and data-wise methods. Algorithm-wise approaches directly tailor the loss function of classification models to better fit the data distribution. However, modifying the loss function only facilitates fitting the label information well and may suffer from generalizing label information when the behaviors of the minority class are diverse. Data-wise approaches generate new samples into the datasets for minority classes or remove existing samples from the datasets for majority classes. Synthetic Minority Oversampling (SMOTE) generates new minority samples by linearly combining a minority sample with its k-nearest minority instances with a manually selected neighborhood size and number of synthetic instances. A series of advancements on SMOTE further introduce density estimation, data distribution-aware sampling to tackle the class imbalance problem without manual selection of neighborhood size and number of synthetic instances.

Instead of conducting synthetic data sampling on a single class, Mixup achieved significant improvements in the image domain by synthesizing data points through linearly combining two random samples from different classes with a given combination ratio and creating soft labels for training the neural networks. As the Mixup assumes that all the classes are uniformly distributed for the image classification task, it is not applicable when the class distribution is skewed. To tackle this limitation, Mix-Boost introduces a skewed probability distribution to sample the combination ratio for linearly combining two heterogeneous samples. However, the imbalanced classification problem assumes that minority samples are clustered within the feature space, which may not be true when the minority class are anomalies. To this end, non-limiting embodiments or aspects of the present disclosure may consider the attributes of a pair of normal and anomaly samples for jointly identifying the best k-nearest neighborhood and the combination ratio. Non-limiting embodiments or aspects of the present disclosure may generate the synthetic samples with the combination ratio and identify the next pair of samples within the k-nearest neighborhood. In this way, non-limiting embodiments or aspects of the present disclosure may be capable of exploiting the label information while exploring the diversely distributed anomalies.

Figure 4:
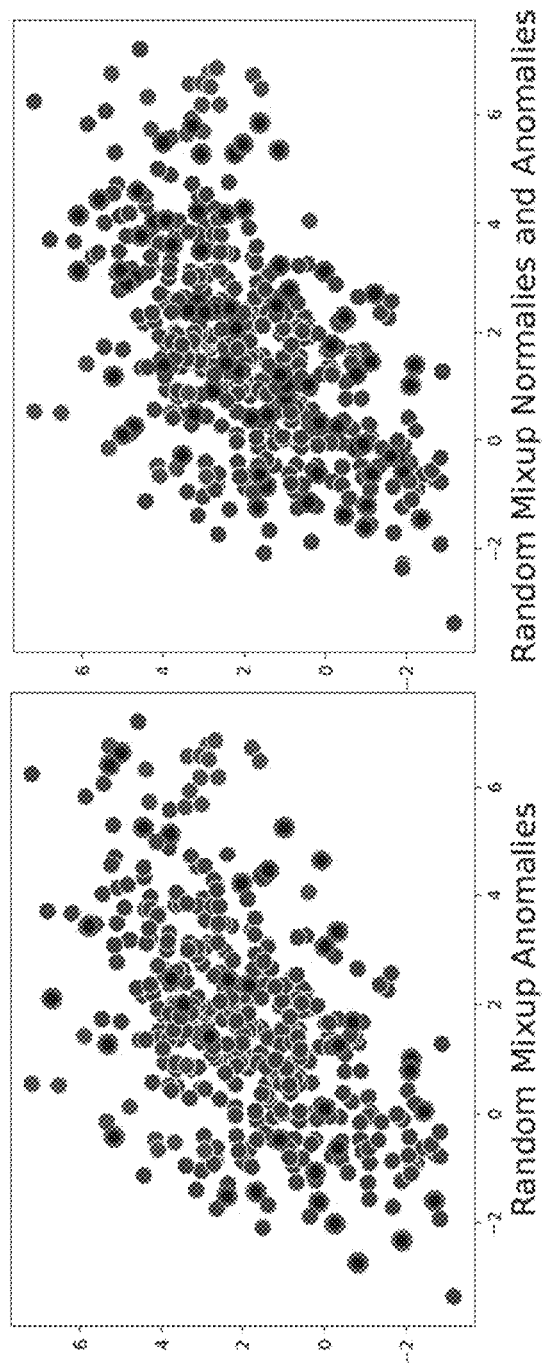
FIG. 4 is graphs providing a comparison between random mix up anomalies (left graph) and random mix up anomalies with normal samples (right graph)

Motivated by the recent success of domain-agnostic data mix up techniques in image domain and imbalance classification problems, a preliminary study to compare the random mix up of anomalies with the random mix up of anomalies and normal samples was conducted on a toy dataset. The dataset simulates the diverse behaviors of anomalies. As shown in FIG. 4, which is graphs providing a comparison between random mix up anomalies (left graph) and random mix up anomalies with normal samples (right graph) in which data points with black colors are synthetic samples and the edge colors are their assigned label (red as anomaly and blue as normal sample), randomly mixing up anomalies creates synthetic samples which seem to have no difference to normal samples, labeled as anomalies (degrading the F1-score from 0.73 to 0.66). Whereas, with proper control of the composition ratio of anomalies and normal samples, synthetic samples generated by mixing up anomalies with normal samples are apparently less noisy and therefore beneficial to the underlying classifier (improving the F1-score from 0.73 to 0.86). Nevertheless, it is non-trivial to select the proper composition ratio and, therefore, different pairs of anomalies and normal samples may require different mix-up strategies toward quality synthetic samples.

To address the issue above, it may be necessary to develop an integrated framework to generalize the knowledge of labeled anomalies for arbitrary classifiers with the goal of advancing supervised anomaly detection. Specifically, given a set of labeled samples, a goal may be to identify a data augmentation strategy to mix up labeled normal samples with anomalies. In this way, the prior knowledge of label information can be generalized and the resulting synthetic samples can be adopted for training the classifiers toward maximal performance improvements. To achieve the goal, non-limiting embodiments or aspects of the present disclosure may learn a sample-wise policy which maps the feature attributes of each data sample into a data augmentation strategy. Meanwhile, the status of model training can be used as a reference to guide the data augmentation.

However, it may be very challenging to develop such a framework for the following reasons. First, as existing data augmentation techniques create synthetic samples only according to feature distribution, there is no existing technique to simultaneously consider feature distribution and model status for synthesizing new samples. Second, even though the model status can be considered to create synthetic samples, the model may not necessarily be converged when synthesizing samples. In this way, the generated synthetic samples may not be beneficial when the model has not converged yet. Third, the augmentation strategy may be composed of discrete and continuous values, and learning such a mapping may be challenging. For example, composition ratio is a continuous number where the number of oversampling is a discrete number.

Non-limiting embodiments or aspects of the present disclosure may obtain a training dataset $X^{train}$ including a plurality of source samples including a plurality of labeled normal samples and a plurality of labeled anomaly samples; and execute a training episode by: (i) initializing a timestamp t; (ii) receiving, from an actor network π of an actor critic framework including the actor network π and a critic network Q, an action vector $a_t$ for the timestamp t, wherein the actor network π is configured to generate the action vector $a_t$ based on a state $s_t$, wherein the state $s_t$ is determined based on a current pair of source samples of the plurality of source samples, and wherein the action vector $a_t$ includes a size of a nearest neighborhood k, a composition ratio α, a number of oversampling n, and a termination probability ∈; (iii) combining the current pair of source samples according to the composition ratio α and the number of oversampling n to generate a labeled synthetic sample $x_{syn}$ associated with a label $y_{syn}$; (iv) training, using the labeled synthetic sample $x_{syn}$ and the label $y_{syn}$, a machine learning classifier φ; (v) obtaining, based on the size of a nearest neighborhood k, source samples in the k-nearest neighborhood of the labeled synthetic sample $x_{syn}$; (vi) generating, with the machine learning classifier φ, for the source samples in the k-nearest neighborhood of the labeled synthetic sample $x_{syn}$ and a subset of the plurality of source samples of the training dataset $X^{train}$ in a validation dataset $X^{val}$, a plurality of classifier outputs; (vii) selecting, from the source samples in the k-nearest neighborhood of the labeled synthetic sample $x_{syn}$, a next pair of source samples; (viii) storing, in a memory buffer, the state $s_t$, the action vector $a_t$, a next state $s_{t+1}$, and a reward $r_t$, wherein the next state $s_{t+1}$ is determined based on the next pair of source samples, and wherein the reward $r_t$ is determined based on the plurality of classifier outputs; (ix) determining whether the termination probability $\in$ satisfies a termination threshold; (x) in response to determining that the termination probability $\in$ fails to satisfy the termination threshold, incrementing the timestamp t, for a number of training steps S: training the critic network Q according to a critic loss function that depends on the state $s_t$, the action vector $a_t$, and the reward $r_t$; and training the actor network $\pi$ according to an actor loss function that depends on an output of the critic network, and after training the actor network $\pi$ and the critic network Q for the number of training steps S, returning to step (ii) with the next pair of source samples as the current pair of source samples; ($x_1$) in response to determining that the termination probability $\in$ satisfies the termination threshold, determining whether the number of training episodes executed satisfies a threshold number of training episodes; (xii) in response to determining that the number of training episodes executed fails to satisfy the threshold number of training episodes, return to step (i) to execute a next training episode; and (xiii) in response to determining that the number of training episodes executed satisfies the threshold number of training episodes, provide the machine learning classifier $\phi$.

In this way, non-limiting embodiments or aspects of the present disclosure may formulate a synthetic oversampling procedure into a Markov decision process and/or tailor an exploratory reward function for learning a data augmenter through exploring an uncertainty of an underlying supervised classifier. For example, by traversing through the feature space of the original dataset with the guidance of model performance and model uncertainty, the generated synthetic samples may follow the original data distribution and/or contain information that is not reflected in the original dataset but may be beneficial to improve the model performance. For example, non-limiting embodiments or aspects of the present disclosure may train a "Data Mixer" that generalizes label information into synthetic data points for training the classifier. As an example, in each step, a pair of data samples with different labels may be sampled as the input of the data mixer and/or a "mix up" or composition ratio may be output to create synthetic samples for the training data, and/or an output k of the data mixer may be leveraged to decide a next pair of samples from a k-nearest neighborhood of the created synthetic sample. In the meantime, an E output by the data mixer may be leveraged to draw a probability to stop the synthetic oversampling process to inhibit or prevent the model from overfitting to the synthetic data samples. In each step, a combinatorial reward signal, which aims at improving classification performance on a validation dataset while exploring the uncertainty of the underlying classifier may be used.

Accordingly, non-limiting embodiments or aspects of the present disclosure may formulate a feature space traversal into a Markov decision process to solve the problem as a sequential decision-making problem with a deep reinforcement learning algorithm. In this way, instead of having a unified strategy to create synthetic data samples, non-limiting embodiments or aspects of the present disclosure may customize a synthetic strategy to individual data points and different underlying classifiers to create fine-grained synthetic samples that provide beneficial information that boosts the performance of anomaly detection. Further, non-limiting embodiments of the present disclosure may provide a reward function that focuses on an improvement of the classification performance, rather than the performance itself. In this way, even though the underlying classifier may not be converged during the training procedure, the classifier may still provide meaningful feedback for training the data mixer. Still further, the reward function according to non-limiting embodiments or aspects of the present disclosure may explore the model uncertainty, which may enable the data to identify potentially beneficial information that was missing in the original dataset for further creating synthetic samples.

Referring now to FIG. 1, FIG. 1 is a diagram of an example environment 100 in which devices, systems, methods, and/or products described herein, may be implemented. As shown in FIG. 1, environment 100 includes transaction processing network 101, which may include merchant system 102, payment gateway system 104, acquirer system 106, transaction service provider system 108, issuer system 110, user device 112, and/or communication network 116. Transaction processing network 101, merchant system 102, payment gateway system 104, acquirer system 106, transaction service provider system 108, issuer system 110, and/or user device 112, may interconnect (e.g., establish a connection to communicate, etc.) via wired connections, wireless connections, or a combination of wired and wireless connections.

Merchant system 102 may include one or more devices capable of receiving information and/or data from payment gateway system 104, acquirer system 106, transaction service provider system 108, issuer system 110, and/or user device 112 (e.g., via communication network 116, etc.) and/or communicating information and/or data to payment gateway system 104, acquirer system 106, transaction service provider system 108, issuer system 110, and/or user device 112 (e.g., via communication network 116, etc.). Merchant system 102 may include a device capable of receiving information and/or data from user device 112 via a communication connection (e.g., an NFC communication connection, an RFID communication connection, a Bluetooth® communication connection, etc.) with user device 112 and/or communicating information and/or data to user device 112 via the communication connection. For example, merchant system 102 may include a computing device, such as a server, a group of servers, a client device, a group of client devices, and/or other like devices. In some non-limiting embodiments or aspects, merchant system 102 may be associated with a merchant as described herein. In some non-limiting embodiments or aspects, merchant system 102 may include one or more devices, such as computers, computer systems, and/or peripheral devices capable of being used by a merchant to conduct a payment transaction with a user. For example, merchant system 102 may include a POS device and/or a POS system.

Payment gateway system 104 may include one or more devices capable of receiving information and/or data from merchant system 102, acquirer system 106, transaction service provider system 108, issuer system 110, and/or user device 112 (e.g., via communication network 116, etc.) and/or communicating information and/or data to merchant system 102, acquirer system 106, transaction service provider system 108, issuer system 110, and/or user device 112 (e.g., via communication network 116, etc.). For example, payment gateway system 104 may include a computing device, such as a server, a group of servers, and/or other like devices. In some non-limiting embodiments or aspects, payment gateway system 104 is associated with a payment gateway as described herein.

Acquirer system 106 may include one or more devices capable of receiving information and/or data from merchant system 102, payment gateway system 104, transaction service provider system 108, issuer system 110, and/or user device 112 (e.g., via communication network 116, etc.) and/or communicating information and/or data to merchant system 102, payment gateway system 104, transaction service provider system 108, issuer system 110, and/or user device 112 (e.g., via communication network 116, etc.). For example, acquirer system 106 may include a computing device, such as a server, a group of servers, and/or other like devices. In some non-limiting embodiments or aspects, acquirer system 106 may be associated with an acquirer as described herein.

Transaction service provider system 108 may include one or more devices capable of receiving information and/or data from merchant system 102, payment gateway system 104, acquirer system 106, issuer system 110, and/or user device 112 (e.g., via communication network 116, etc.) and/or communicating information and/or data to merchant system 102, payment gateway system 104, acquirer system 106, issuer system 110, and/or user device 112 (e.g., via communication network 116, etc.). For example, transaction service provider system 108 may include a computing device, such as a server (e.g., a transaction processing server, etc.), a group of servers, and/or other like devices. In some non-limiting embodiments or aspects, transaction service provider system 108 may be associated with a transaction service provider as described herein. In some non-limiting embodiments or aspects, transaction service provider 108 may include and/or access one or more internal and/or external databases including transaction data.

Issuer system 110 may include one or more devices capable of receiving information and/or data from merchant system 102, payment gateway system 104, acquirer system 106, transaction service provider system 108, and/or user device 112 (e.g., via communication network 116, etc.) and/or communicating information and/or data to merchant system 102, payment gateway system 104, acquirer system 106, transaction service provider system 108, and/or user device 112 (e.g., via communication network 116 etc.). For example, issuer system 110 may include a computing device, such as a server, a group of servers, and/or other like devices. In some non-limiting embodiments or aspects, issuer system 110 may be associated with an issuer institution as described herein. For example, issuer system 110 may be associated with an issuer institution that issued a payment account or instrument (e.g., a credit account, a debit account, a credit card, a debit card, etc.) to a user (e.g., a user associated with user device 112, etc.).

In some non-limiting embodiments or aspects, transaction processing network 101 includes a plurality of systems in a communication path for processing a transaction.

For example, transaction processing network 101 can include merchant system 102, payment gateway system 104, acquirer system 106, transaction service provider system 108, and/or issuer system 110 in a communication path (e.g., a communication path, a communication channel, a communication network, etc.) for processing an electronic payment transaction. As an example, transaction processing network 101 can process (e.g., initiate, conduct, authorize, etc.) an electronic payment transaction via the communication path between merchant system 102, payment gateway system 104, acquirer system 106, transaction service provider system 108, and/or issuer system 110.

User device 112 may include one or more devices capable of receiving information and/or data from merchant system 102, payment gateway system 104, acquirer system 106, transaction service provider system 108, and/or issuer system 110 (e.g., via communication network 116, etc.) and/or communicating information and/or data to merchant system 102, payment gateway system 104, acquirer system 106, transaction service provider system 108, and/or issuer system 110 (e.g., via communication network 116, etc.). For example, user device 112 may include a client device and/or the like. In some non-limiting embodiments or aspects, user device 112 may be capable of receiving information (e.g., from merchant system 102, etc.) via a short range wireless communication connection (e.g., an NFC communication connection, an RFID communication connection, a Bluetooth® communication connection, and/or the like), and/or communicating information (e.g., to merchant system 102, etc.) via a short range wireless communication connection. In some non-limiting embodiments or aspects, user device 112 may include an application associated with user device 112, such as an application stored on user device 112, a mobile application (e.g., a mobile device application, a native application for a mobile device, a mobile cloud application for a mobile device, an electronic wallet application, an issuer bank application, and/or the like) stored and/or executed on user device 112. In some non-limiting embodiments or aspects, user device 112 may be associated with a sender account and/or a receiving account in a payment network for one or more transactions in the payment network.

Communication network 116 may include one or more wired and/or wireless networks. For example, communication network 116 may include a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and systems shown in FIG. 1 is provided as an example. There may be additional devices and/or systems, fewer devices and/or systems, different devices and/or systems, or differently arranged devices and/or systems than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. Additionally or alternatively, a set of devices and/or systems (e.g., one or more devices or systems) of environment 100 may perform one or more functions described as being performed by another set of devices and/or systems of environment 100.

Figure 2:
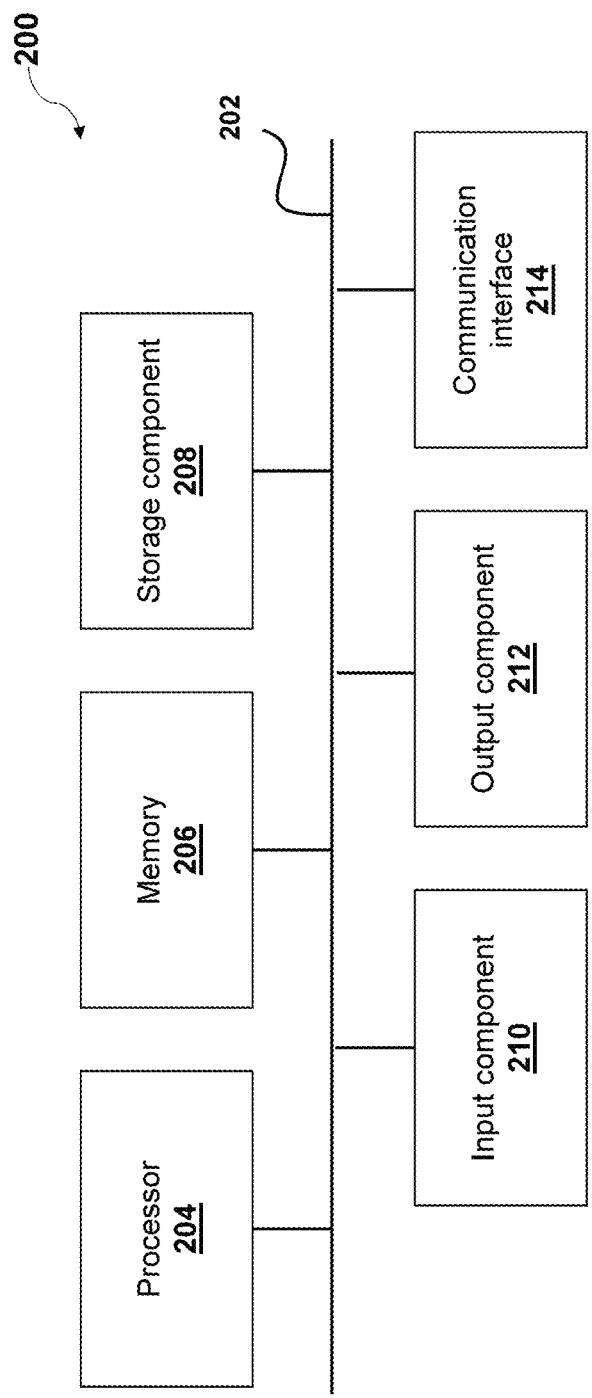
FIG. 2 is a diagram of non-limiting embodiments or aspects of components of one or more devices and/or one or more systems of FIG. 1.

Referring now to FIG. 2, FIG. 2 is a diagram of example components of a device 200. Device 200 may correspond to one or more devices of merchant system 102, one or more devices of payment gateway system 104, one or more devices of acquirer system 106, one or more devices of transaction service provider system 108, one or more devices of issuer system 110, and/or user device 112 (e.g., one or more devices of a system of user device 112, etc.). In some non-limiting embodiments or aspects, one or more devices of merchant system 102, one or more devices of payment gateway system 104, one or more devices of acquirer system 106, one or more devices of transaction service provider system 108, one or more devices of issuer system 110, and/or user device 112 (e.g., one or more devices of a system of user device 112, etc.) may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 (e.g., a central processing unit (CPU), a graphics processing unit (GPU), etc.) executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3A:
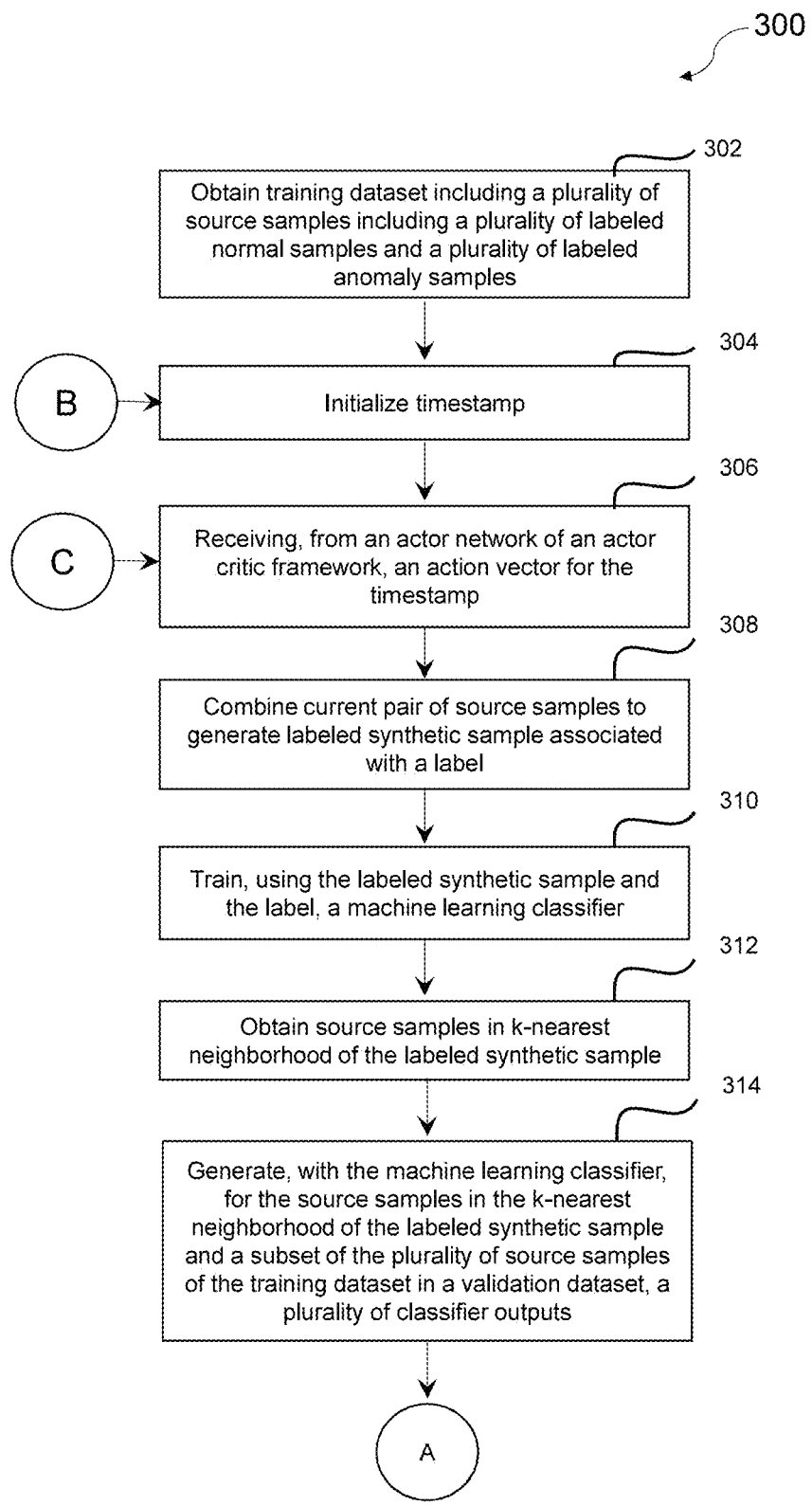
FIGS. 3A-3C are a flowchart of non-limiting embodiments or aspects of a process for synthetic oversampling for boosting supervised anomaly detection.
Figure 3B:
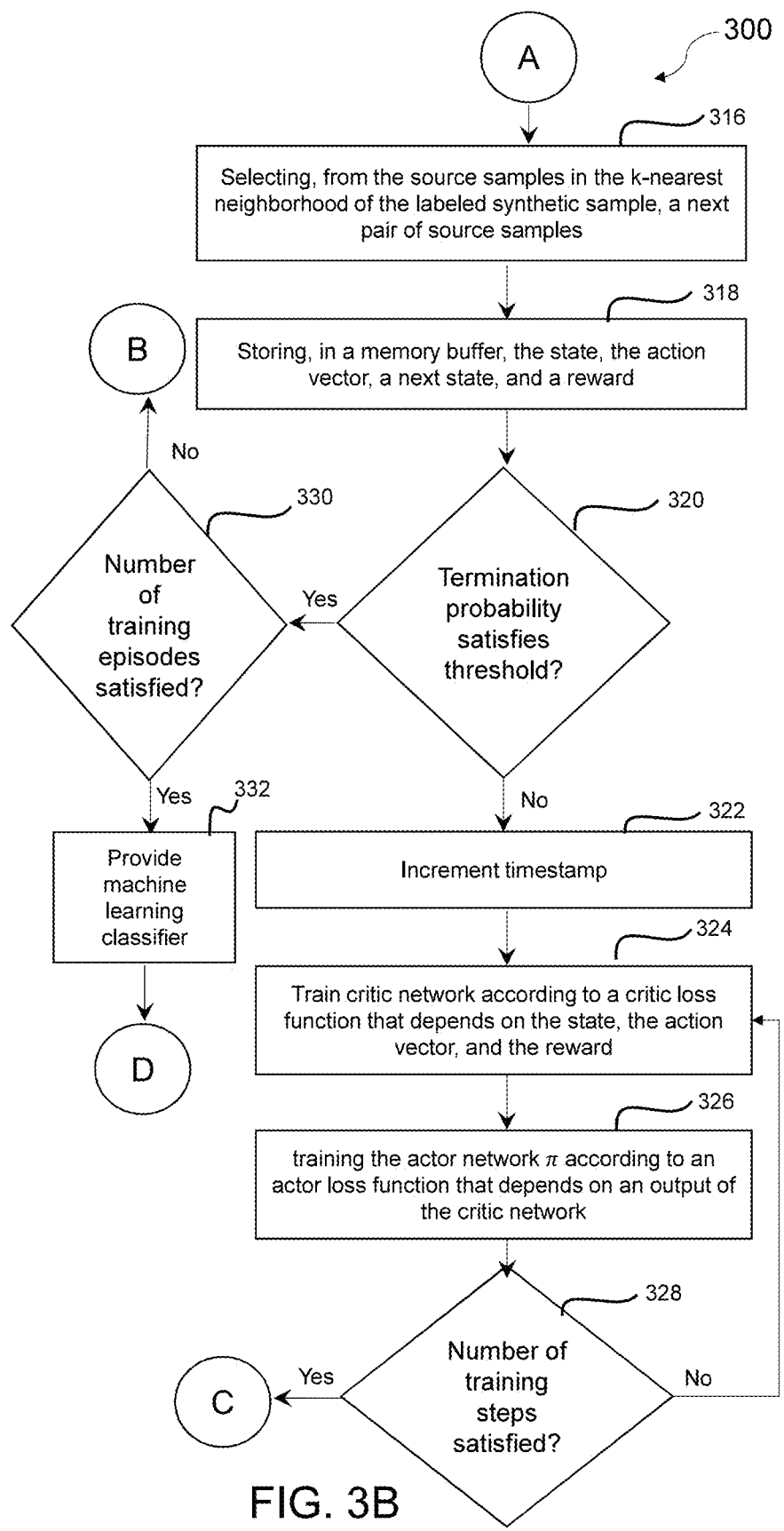
Figure 3C:
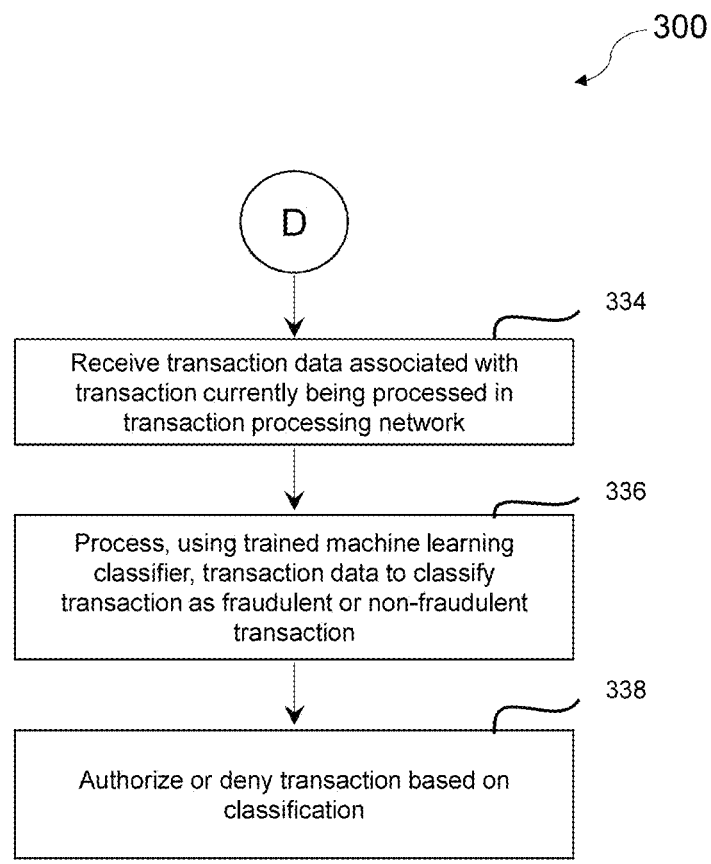

Referring now to FIGS. 3A-3C, FIGS. 3A-3C is a flowchart of non-limiting embodiments or aspects of a process 300 for synthetic oversampling for boosting supervised anomaly detection. In some non-limiting embodiments or aspects, one or more of the steps of process 300 may be performed (e.g., completely, partially, etc.) by transaction service provider system 108 (e.g., one or more devices of transaction service provider system 108, etc.). In some non-limiting embodiments or aspects, one or more of the steps of process 300 may be performed (e.g., completely, partially, etc.) by another device or a group of devices separate from or including transaction service provider system 108, such as merchant system 102 (e.g., one or more devices of merchant system 102), payment gateway system 104 (e.g., one or more devices of payment gateway system 104), acquirer system 106 (e.g., one or more devices of acquirer system 106), issuer system 110 (e.g., one or more devices of issuer system 110), and/or user device 112 (e.g., one or more devices of a system of user device 112).

As shown in FIG. 3A, at step 302, process 300 includes obtaining a training dataset including a plurality of source samples including a plurality of labeled normal samples and a plurality of labeled anomaly samples. For example, transaction service provider system may obtain a training dataset $X^{train}$ including a plurality of source samples including a plurality of labeled normal samples and a plurality of labeled anomaly samples. As an example, following a setting of semi-supervised anomaly detection, a training dataset of supervised anomaly detection $X^{train}=\{x_1, x_2, \ldots, x_{n+m}\}$ may be composed of a set of labeled non-anomalies or normalies $N=\{x_1, x_2, \ldots, x_n\}$ and a set of labeled anomalies $A=\{x_{n+1}, x_{n+2}, \ldots, x_{n+m}\}$, where n»m. A goal of supervised anomaly detection may be to learn a classifier $\phi: X \rightarrow \mathbb{R}$ which evaluates the probability of individual data points as anomalies in the given dataset X via exploiting the prior knowledge of labeled normalies N and anomalies A, so that $\phi(x_i) > \phi(x_j)$ when $x_i \in A$ and $x_j \in N$. In some non-limiting embodiments or aspects, the plurality of source samples may be associated with a plurality of transactions in transaction processing network 101, the plurality of labeled normal samples may be associated with a plurality of non-fraudulent transactions of the plurality of transactions, and/or the plurality of labeled anomaly samples may be associated with a plurality of fraudulent transactions of the plurality of transactions.

To better generalize the knowledge from the label information, a problem of strategic data augmentation may be defined as follows: Given a dataset $X^{train}=\{N,A\}$ where $X^{train} \in \mathbb{R}^{(n+m) \times d}$, with a supervised classifier $\phi$, non-limiting embodiments or aspects of the present disclosure may have a target or objective of augmenting the dataset $X^{train}$ with a synthetic dataset $X^{syn}$ according to the $\phi$, where the synthetic dataset $X^{syn} \in \mathbb{R}^{l \times d}$ is generated via mixing up samples from N with samples from A. For example, an objective of non-limiting embodiments or aspects of the present disclosure may be to properly sample pairs of data instances from N and A with corresponding mix up ratio $\alpha$ to create synthetic instances $x^{syn} \in X^{syn}$, such that the performance of $\phi$ can be improved or maximized by being trained on $X^{train}=\{X^{train} \cup X^{syn}\}$.

To leverage label information from two different classes, Mixup, which is disclosed in the paper titled "Mixup: Beyond empirical risk minimization" by Hongyi Zhang, Moustapha Cisse, Yann N Dauphin, and David Lopez-Paz, 2017 (arXiv preprint arXiv:1710.09412), the disclosure of which is hereby incorporated by reference in its entirety, performs synthetic data generation over two samples from different classes, which has been extensively studied to augment image and textual data. An idea of Mixup is to linearly combine two samples according to the following Equation (1):

$$x_{syn} = \alpha * x_0 + (1-\alpha) * x_1$$

where $\alpha \in [0.0, 1.0]$ controls the composition of $x^{syn}$. Although existing works generate a soft label of $x^{syn}$ in the same fashion for the imbalance classification problem, the diverse behaviors of the anomalies lead to the similar labels with high granularity on diverse synthetic samples, which may prompt the model to over-fit on noisy synthetic labels. To this end, instead of generating soft labels, non-limiting embodiments or aspects of the present disclosure may synthesize hard labels for $x^{syn}$ according to the following Equation (2):

$$y_{syn} = \begin{cases} y_0, & \alpha \geq 0.5 \\ y_1, & \text{otherwise} \end{cases} \quad (2)$$

Figure 5:
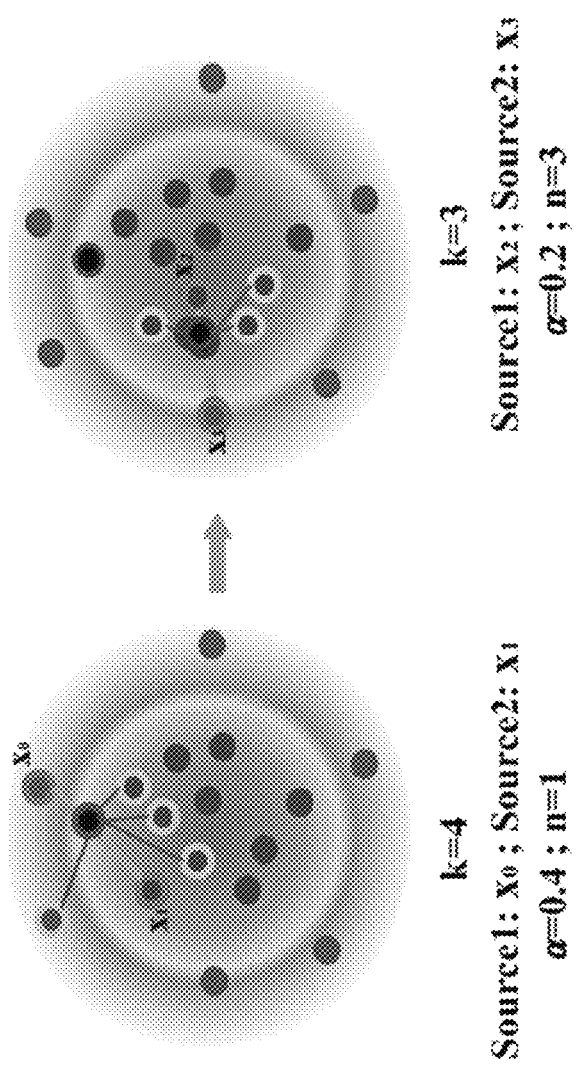
FIG. 5 illustrates non-limiting embodiments or aspects of an iterative mix-up process.

Due to the diverse behavior of anomalies, arbitrarily mixing up two random source samples from the dataset $X^{train}$ may lead to noisy samples. To tackle this problem, non-limiting embodiments or aspects of the present disclosure may seek to identify a meaningful pair of samples for synthesizing new samples. As normal samples are often concentrated in the latent space, and borderline samples are more informative, non-limiting embodiments or aspects of the present disclosure may traverse the feature space of $X^{train}$ with the guidance of the decision boundary of the model $\phi$ for synthetic oversampling. For example, given a pair of arbitrary source samples, non-limiting embodiments or aspects of the present disclosure may consider the attributes of the two samples to identify corresponding a and number of oversampling for generating a set of $x_{syn} \in X^{syn}$. Meanwhile, an optimal range for uniformly sampling the next pair of source samples may be identified according to the model status for iterating to the next round of the mix-up process. An intuition behind the uniform sampling is to consider the relationship between the attributes of the source samples and their entire neighborhood information instead of focusing on a certain sample in the neighborhood. Referring also to FIG. 5, FIG. 5 illustrates non-limiting embodiments or aspects of an iterative mix-up process. In FIG. 5, the background colors indicate the model decision boundary. The attributes of the source samples (purple circled) are considered to specify the composition ratio $\alpha$ for oversampling the synthetic sample (black points) with corresponding labels (outer circle of black points) n times. A k-nearest neighborhood is identified for randomly sampling the next pair of source samples. The process iterates to the next round with the new pair of source samples. For example, as shown in FIG. 5, based on the attributes of source samples $x_0$ and $x_1$, the composition ratio $\alpha=4$ is specified and the number of oversampling n=1 for creating synthetic sample $x^{syn}$. A k-nearest neighborhood is identified to randomly sample the next pair of source samples $x_2$ and $x_3$ for the next round of mix-up.

An iterative mix-up process according to non-limiting embodiments or aspects of the present disclosure may have several desirable properties. The iterative mix-up process can make personalized decisions. As an example, more samples may be generated for some instances and fewer samples may be generated for other instances. The iterative mix-up process can incorporate various information to guide the mix-up process. As an example, data attributes and model status can be considered and serve as guidance for generating samples. The iterative mix-up process, by simultaneously considering the model status with the feature distribution, may directly generate information that is missing in the original dataset but beneficial for model training.

Figure 6:
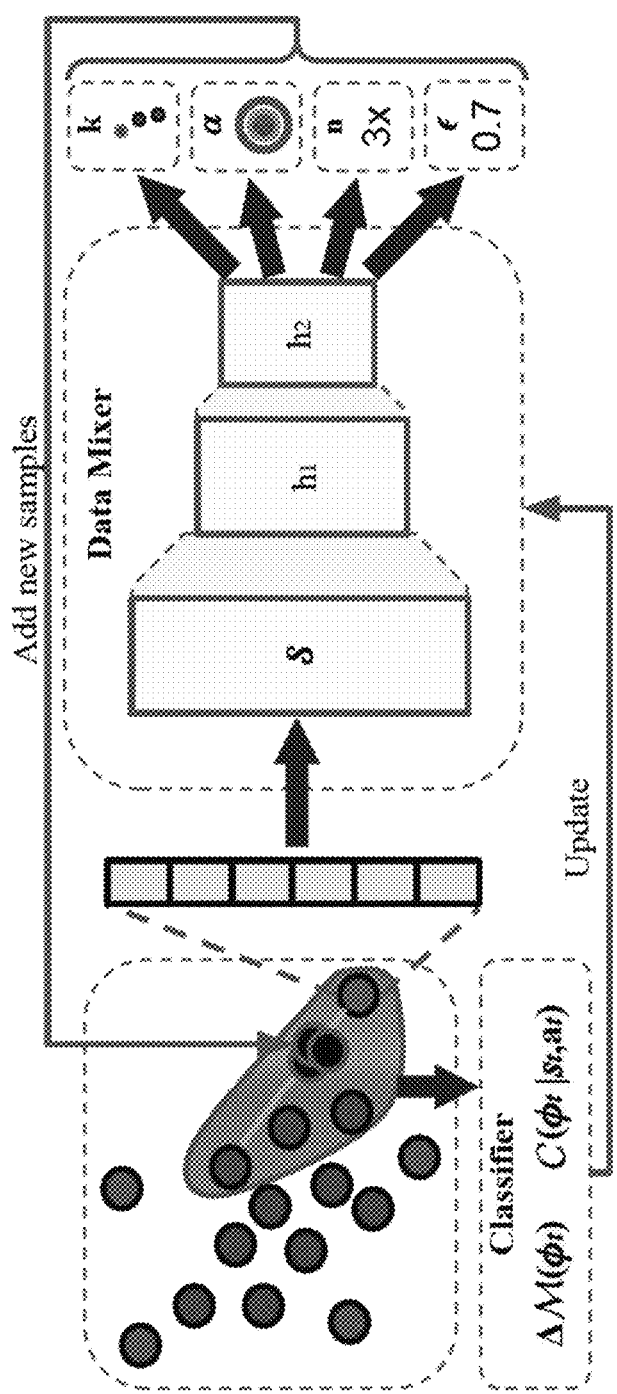
FIG. 6 illustrates non-limiting embodiments or aspects of a network architecture for synthetic oversampling for boosting supervised anomaly detection.

Still referring to FIG. 5, and referring also to FIG. 6, which illustrates non-limiting embodiments or aspects of a network architecture for synthetic oversampling for boosting supervised anomaly detection, an iterative mix-up process according to non-limiting embodiments or aspects of the present disclosure can be formulated as a Markov decision process (MDP) with a quintuple ($\mathcal{S}, \mathcal{A}, \mathcal{R}, \mathcal{T}$), where $\mathcal{S}$ is a finite set of states, $\mathcal{A}$ is a finite set of actions, $\mathcal{T}: \mathcal{S} \times \mathcal{A} \rightarrow \mathcal{S}$ is the state transition function that maps the current state s, action a to the next state s', $\mathcal{R}: \mathcal{S} \times \mathcal{A} \rightarrow \mathbb{R}$ is the immediate reward $\mathcal{R}$ function that reflects the quality of action a for the state s, and $\gamma$ is a decade factor to gradually consider the future transitions. To sample-wise tailor the mix-up strategy, a data mixer that maps the attributes of source data samples into an augmentation strategy for creating synthetic samples while exploring model decision boundaries may be learned. The MDP may be defined as follows:

State Space ($\mathcal{S}$): At each timestamp t, state $s_t \in \mathcal{S}$ may be defined as $s_t=(x_0^t, x_1^t)$, where $s_t \in \mathbb{R}^{2m}$ is a concatenation of two m-dimensional feature vectors of the two source samples. Therefore, the state space may be defined as $\mathcal{S}=\{(x_0^t, x_1^t) | x_0^t, x_1^t \in X^{train}\}$.

Action Space ($\mathcal{A}$): At each timestamp t, the action $a_t \in \mathcal{A}$ where $a_t=(k, \alpha, n, \epsilon)$ may be a vector composed of the size of neighborhood k, composition ratio $\alpha$, number of oversampling n, and the termination probability of the iterative mix-up process $\epsilon$. Therefore, the action space may be defined as a discrete-continuous space $\mathcal{A}=\{(, \alpha_t, n_t, \epsilon_t) | k_t, n_t, \epsilon_t \in \mathbb{N}, \alpha_t \in \mathbb{R}^+\}$.

Transition Function ($\mathcal{T}$) Given a state $s_t=(x_0^t, x_1^t)$ and an action $a_t=(k, \alpha, n, \epsilon)$, the transition function may adopt $\alpha$ using Equations (1) and (2) to oversample $x_{syn}$ for n times. The resulting synthetic samples $X_{syn}$ may be adopted for training the classifier and lead to a classifier $\phi_t$ in timestamp t. The transition function may shift to the next state $s_{t+1}=(x_0'^{t+1}, x_1'^{t+1})$ where the $x_0'^{t+1}$, is randomly sampled from the k-nearest neighborhood of the $x_{syn}$ and the $x_1'^{t+1}$ is identified as the nearest data point with different label from $x_0'^{t+1}$.

Reward Function ($\mathcal{R}$): The reward signal $r_t$ for each timestamp t may be designed to encourage performance improvement while exploring the decision boundaries of the classifier $\phi$. Therefore, the reward function may be defined according to the following Equation (3):

$$\mathcal{R}(s_t, a_t) = \lambda * \Delta \mathcal{M}(\phi_t) * C(\phi_t | s_t, a_t), \quad (3)$$

where $\lambda$ is a hyperparameter to define the strength of the reward signal, $\mathcal{M}$ is an evaluation metric, and $\Delta \mathcal{M}(\phi_t)$ measures the performance improvement of $\phi_t$. The $C(\phi_t | s_t, a_t)$ evaluates the model confidence to encourage exploring the decision space of $\phi_t$. In this way, the reward signal may drive the data mixer to explore the classifier while achieving maximum improvement with the newly synthesized data samples.

To solve the MDP, a parameterized policy $\pi_\theta$ may be defined as the data mixer to maximize the reward signal of the MDP, where an ultimate goal is to learn an optimal policy $\pi_\theta^*$ that maximize the cumulative reward $$\mathbb{E}\left[\sum_{t=0}^{\infty} \gamma^t r_t\right].$$

However, the action space of the iterative mix-up process is a discrete-continuous vector and the reward signals generated from an under-fitted $\phi_t$ may be instable. To this end, non-limiting embodiments or aspects of the present disclosure may employ the deep deterministic policy gradient (DDPG) as disclosed in the paper titled "Continuous control with deep reinforcement learning" by Timothy P Lillicrap, Jonathan J Hunt, Alexander Pritzel, Nicolas Heess, Tom Erez, Yuval Tassa, David Silver, and Daan Wierstra, 2015 (arXiv preprint arXiv:1509.02971, the disclosure of which is hereby incorporated by reference in its entirety, which an actor-critic framework that equips with two separate networks: actor and critic. The critic network $(s_t, a_t | \theta_1)$ approximates the reward signal for a state-action pair from the MDP, while the actor network $(s_t | \theta_2)$ aims to learn the policy for given a state $s_t$ based on the critic network. Additionally, or alternatively, an advanced actor-critic framework such as soft actor-critic as disclosed in the paper titled "Soft actor-critic: Off-policy maximum entropy deep reinforcement learning with a stochastic actor" by Tuomas Haarnoja, Aurick Zhou, Pieter Abbeel, and Sergey Levine, 2018, In International conference on machine learning. PMLR, 1861-1870, the disclosure of which is hereby incorporated by reference in its entirety, may be adopted to learn the policy TCB.

To perform a continuous action, the DDPG learns an actor network $(s_t | \theta_1)$ that deterministically maps a given state $s_t$ to an action vector $a_t$ and trains the network by maximizing the approximated cumulative reward generated by the critic network $(.|\theta_2)$. For example, given N transitions, a projected action $(s_t | \theta_1)$ may be generated as the input of the critic to minimize a loss function defined according to the following Equation (4):

$$L_\pi(\theta_1) = -\frac{1}{N}\sum_{i=1}^{N} Q(s_i, \pi(s_i)|\theta_2) \quad (4)$$

where the action $\pi(s_i)$ is a 4-dimensional real number vector. To fully leverage the expressive power of the deep neural network during the training while outputting a discrete-continuous vector for the MDP, the continuous action vector $(s_i)$ may be transformed with a sigmoid function and yield the action vector $a_i = w^\circ \sigma(\pi(s_i|\theta_1))$ where w specifies the value constraints of individual entries. For example, if the maximum for the k and n are 10 and 5, then w=[10, 1, 5, 1] since a and E are expected to be ranging from 0 to 1. The outcome for the k and n may be rounded to the nearest integer.

To tackle the in-stable reward signal issue, the DDPG approximates the reward signal with the critic network $(.|\theta_2)$ and trains the networks in an off-policy fashion. It introduces a replay buffer to store historical and randomly sample transitions to minimize the temporal correlation between two transitions for learning across a set of uncorrelated transitions. For example, the critic network $(.|\theta_2)$ may map a state-action pair into a real value $y_t$ via minimizing a loss function defined according to the following Equation (5):

$$L_Q(\theta_2) = [Q(s_t, a_t) - b_t]^2 \quad (5)$$

where $b_t = \mathcal{R}(s_t, a_t) + \gamma Q(s_{t+1}, \pi(s_{t+1}||\theta_1) \theta_2)$ is a signal derived from the Bellman equation which considers the recursive relation between the current real and the future approximated reward signals for maximizing cumulative reward where $\pi(s_{t+1}|\theta_1)$ is an action specified by the actor network and the $\gamma$ is the decade factor.

As shown in FIG. 3A, at step 304, process 300 includes initializing a time stamp. For example, transaction service provider system 108 may initialize a timestamp t. As an example, and referring also to FIG. 7, which illustrates an implementation of non-limiting embodiments or aspects of a training procedure of a process for synthetic oversampling for boosting supervised anomaly detection, transaction service provider system 108 may initialize the timestamp t when executing a training episode e of a number of training episodes E to be executed. In such an example, transaction service provider system 108 may initialize the timestamp t in response to executing each training episode e of the number of training episodes E to be executed (e.g., in response to executing a new or next training episode, etc.).

As shown in FIG. 3A, at step 306, process 300 includes receiving, from an actor network of an actor critic framework including the actor network and a critic network, an action vector for the timestamp. For example, and referring again to FIGS. 6 and 7, transaction service provider system 108 may receive, from an actor network π of an actor critic framework including the actor network π and a critic network Q, an action vector $a_t$ for the timestamp t. The actor network T may be configured to generate the action vector at based on a state $s_t$. The state $s_t$ may be determined based on a current pair of source samples of the plurality of source samples. The action vector $a_t$ may include a size of a nearest neighborhood k, a composition ratio α, a number of oversampling n, and a termination probability $\epsilon$.

As shown in FIG. 3A, at step 308, process 300 includes combining the current pair of source samples according to the composition ratio and the number of oversampling to generate a labeled synthetic sample associated with a label. For example, transaction service provider system 108 may combine the current pair of source samples according to the composition ratio α and the number of oversampling n to generate a labeled synthetic sample $x_{syn}$ associated with a label $y_{syn}$.

In some non-limiting embodiment or aspects, the current pair of source samples may be combined according to the composition ratio α to generate the labeled synthetic sample $x_{syn}$ according to Equations (1) and (2), where $x_0$ is a first sample of the current pair of samples, $x_i$ is a second sample of the current pair of samples, $y_{syn}$ is a hard label for the labeled synthetic sample $x_{syn}$, $y_0$ is a first hard label value, and $y_1$ is a second hard label value.

As shown in FIG. 3A, at step 310, process 300 includes training, using the labeled synthetic sample and the label, a machine learning classifier. For example, transaction service provider system 108 may train, using the labeled synthetic sample $x_{syn}$ and the label $y_{syn}$, a machine learning classifier ϕ. As an example, transaction service provider system 108 may provide, as input to the machine learning classifier P, the labeled synthetic sample $x_{syn}$, and modify one or more parameters of the machine learning classifier ϕ, according to an objective function that depends on the output of the machine learning classifier ϕ for the labeled synthetic sample $x_{syn}$ and the label $y_{syn}$. For example, and referring again to FIG. 6, in each step, a pair of normal samples and anomalies may be input to the data mixer, the corresponding action may be generated to create synthetic samples, and the synthetic samples are adopted to train the classifier and yield the reward signal for updating the data mixer.

As shown in FIG. 3A, at step 312, process 300 includes obtaining, based on the size of a nearest neighborhood, source samples in the k-nearest neighborhood of the labeled synthetic sample. For example, transaction service provider system 108 may obtain, based on the size of a nearest neighborhood k, source samples in the k-nearest neighborhood of the labeled synthetic sample $x_{syn}$. As an example, transaction service provider system 108 may computing, using a k-nearest neighbors algorithm, source samples in the k-nearest neighborhood of the labeled synthetic sample $x_{syn}$.

In some non-limiting embodiments or aspects, transaction service provider system 102 may, before executing the training episode (e.g., before executing any training episode, etc.), train, using the training dataset $X^{train}$, the machine learning classifier ϕ; and pre-compute each k-nearest neighborhood for each source sample of the plurality of source samples in the training dataset $X^{train}$. Transaction service provider system 102 may store the pre-computed each k-nearest neighborhood for each source sample of the plurality of source samples in the training dataset $X^{train}$ for use during the training procedure. In this way, non-limiting embodiments or aspects of the present disclosure may reduce a computational cost during the training procedure.

As shown in FIG. 3A, at step 314, process 300 includes generating, with the machine learning classifier, for the source samples in the k-nearest neighborhood of the labeled synthetic sample and a subset of the plurality of source samples of the training dataset in a validation dataset, a plurality of classifier outputs. For example, transaction service provider system 108 may generate, with the machine learning classifier ϕ, for the source samples in the k-nearest neighborhood of the labeled synthetic sample $x_{syn}$ and a subset of the plurality of source samples of the training dataset $X^{train}$ in a validation dataset $X^{val}$ a plurality of classifier outputs. As an example, transaction service provider system 108 may provide, as input to the machine learning classifier ϕ, the source samples in the k-nearest neighborhood of the labeled synthetic sample $x_{syn}$ and a subset of the plurality of source samples of the training dataset $X^{train}$ in a validation dataset $X^{val}$, and receive, as output from the machine learning classifier ϕ, a plurality of classifier outputs.

As shown in FIG. 3B, at step 316, process 300 includes selecting, from the source samples in the k-nearest neighborhood of the labeled synthetic sample, a next pair of source samples. For example, transaction service provider system 108 may select (e.g., randomly select, etc.), from the source samples in the k-nearest neighborhood of the labeled synthetic sample $x_{syn}$, a next pair of source samples.

As shown in FIG. 3B, at step 318, process 300 includes storing, in a memory buffer, the state, the action vector, a next state, and a reward. For example, transaction service provider system 108 may store, in a memory buffer, the state $s_t$, the action vector at, a next state $s_{t+1}$, and a reward $r_t$. The next state $s_{t+1}$ may be determined based on the next pair of source samples. The reward $r_t$ may be determined based on the plurality of classifier outputs.

In some non-limiting embodiments or aspects, the reward $r_t$ may be determined according to the following Equations (6) and (7):

$$\Delta M(\phi_t) = M(\phi_t(X^{val}), y^{val}) - \frac{\sum_{i=t-m}^{t-1} M(\phi_i(X^{val}), y^{val})}{m-1} \quad (6)$$

$$C(\phi_t|s_t, a_t) = \frac{1}{k}\sum_{i=0}^{k} P(y_i=0|x_i, \phi_t)P(y_i=1|x_i, \phi_t) \quad (7)$$

where M is an evaluation metric, $\Delta M(\phi_t)$ measures a performance improvement of the trained classifier $\phi_t$, $X^{val}$ is the validation data set, $y^{val}$ is a label set for the training data set, where $$\frac{\sum_{i=t-m}^{t-1} M(\phi_i(X^{val}), y^{val})}{m-1}$$

is a baseline for the timestamp t, m is a hyperparameter to define a buffer size for forming the baseline, $C(\phi_t|st, at)$ evaluates a model confidence of the trained classifier $\phi_t$, P is a model exploration function, k is the size of the nearest neighborhood specified by the action vector $a_t$, $x_i$ is a k-nearest neighborhood of the labeled synthetic sample $x_{syn}$ in timestamp t, and $y_1$ is a label for x.

For example, the reward signal may include an improvement stimulation component $\Delta \mathcal{M}$ (ϕt) and model exploration component $P(\phi_t|s_t, a_t)$. To learn an optimal policy for the target tasks, existing solutions directly adopt the performance on a validation dataset as a reward signal. However, as the convergence of the underlying classifier is not guaranteed, directly learning a policy with the performance on a validation set may lead to noisy reward signals. As a result, rather than using the current model's performance $phi_t$, non-limiting embodiments or aspects of the present disclosure provide an improvement stimulation to pursue the maximum model improvement on the validation set with a baseline performance according to (6). In such an example, synthetic samples may be created by mixing normal samples and anomalies while iteratively training the classifier ϕ, while exploring model decision boundaries to create beneficial samples and reduce or prevent generating noisy samples. Accordingly, a model exploration signal to quantify the instance-wise prediction uncertainty may be defined according to Equation (7) to encourage the data mixer to explore the uncertain area in the feature space.

As shown in FIG. 3B, at step 320, process 300 includes determining whether the termination probability satisfies a termination threshold. For example, transaction service provider system 108 may determine whether the termination probability ∈ satisfies a termination threshold (e.g., a predetermined termination threshold, a hyperparameter set by a user, etc.) As an example, and referring again to FIG. 7, transaction service provider system 108 may iteratively train the classifier ϕ until the termination probability E satisfies the terminal threshold.

As shown in FIG. 3B, at step 322, process 300 includes, in response to determining that the termination probability fails to satisfy the termination threshold in step 320, incrementing the timestamp. For example, transaction service provider system 108 may, in response to determining that the termination probability ∈ fails to satisfy the termination threshold in step 320, increment the timestamp t.

As shown in FIG. 3B, at step 324, process 300 includes training the critic network according to a critic loss function that depends on the state, the action vector, and the reward. For example, transaction service provider system 108 may train the critic network Q according to a critic loss function that depends on the state $s_t$, the action vector $a_t$, and the reward $r_t$. As an example, the critic loss function may be defined according to Equation (5), where $b_t = R(s_t, a_t) + \gamma Q(s_{t+1}, \pi(s_{t+1}|\theta_1)|\theta_2)$, $\pi(s_{t+1}|\theta_1)$ is an action specified by the actor network, and γ is a decade factor.

As shown in FIG. 3B, at step 326, process 300 includes training the actor network according to an actor loss function that depends on an output of the critic network. For example, transaction service provider system 108 may train the actor network 7 according to an actor loss function that depends on an output of the critic network. As an example, the actor function may be defined according to Equation (4), where N is a number of transitions, $\pi(s_i|\theta_2)$ is a projected action for a state $s_i$, and $Q(s_i, \pi(s_i)|\theta_2)$ is an output of the critic network for the projected action $\pi(s_i|\theta_2)$ and state $s_i$.

As shown in FIG. 3B, at step 328, process 300 includes determining whether the actor network and the critic network have been trained for a number of training steps. For example, transaction service provider system 108 may determine whether the actor network π and the critic network Q have been trained for a number of training steps S.

In response to determining that the actor network and the critic network have not been trained for the number of training steps in step 328, processing may return to step 324 to train the actor network and the critic network in the next training step. For example, transaction service provider system 108 may, in response to determining that the actor network π and the critic network Q have not been trained for the number of training steps S in step 328, return processing to step 324 to train the actor network π and the critic network Q in the next training step.

In response to determining that the actor network and the critic network have been trained for the number of training steps in step 328, processing may return to step 306 with the next pair of source samples as the current pair of source samples. For example, transaction service provider system 108 may, in response to determining that the actor network if and the critic network Q have been trained for the number of training steps S in step 328, return processing to step 306 with the next pair of source samples as the current pair of source samples.

As shown in FIG. 3B, at step 330, process 300 includes, in response to determining that the termination probability satisfies the termination threshold in step 320, determining whether the number of training episodes executed satisfies a threshold number of training episodes. For example, transaction service provider system 108 may, in response to determining that the termination probability ∈ satisfies the termination threshold in step 320, determine whether the number of training episodes executed satisfies a threshold number of training episodes.

In response to determining that the number of training episodes executed fails to satisfy the threshold number of training episodes in step 330, processing may return to step 304 to execute a next training episode. For example, transaction service provider system 108 may, in response to determining that the number of training episodes executed fails to satisfy the threshold number of training episodes, return processing to step 304 to execute a next training episode.

As shown in FIG. 3B, at step 332, process 300 includes, in response to determining that the number of training episodes executed satisfies the threshold number of training episodes, providing the machine learning classifier. For example, transaction service provider system 108 may, in response to determining that the number of training episodes executed satisfies the threshold number of training episodes, provide the machine learning classifier ϕ (e.g., provide the trained machine learning classifier, etc.).

As shown in FIG. 3C, at step 334, process 300 includes receiving transaction data associated with a transaction currently being processed in the transaction processing network. For example, transaction service provider system 108 may receive transaction data associated with a transaction currently being processed in transaction processing network 101.

In some non-limiting embodiments or aspects, transaction data may include parameters associated with a transaction, such as an account identifier (e.g., a PAN, etc.), a transaction amount, a transaction date and time, a type of products and/or services associated with the transaction, a conversion rate of currency, a type of currency, a merchant type, a merchant name, a merchant location, a transaction approval (and/or decline) rate, and/or the like.

As shown in FIG. 3C, at step 336, process 300 includes processing, using the trained machine learning classifier, the transaction data to classify the transaction as a fraudulent or non-fraudulent transaction. For example, transaction service provider system 108 may process, using the trained machine learning classifier, the transaction data to classify the transaction as a fraudulent or non-fraudulent transaction. As an example, transaction service provider system 108 may provide, as input to the trained machine learning classifier, one or more parameters of the transaction data and receive, as output from the trained machine learning classifier, a prediction (e.g., a probability, a likelihood, a yes/no, etc.) that the transaction is a fraudulent or non-fraudulent transaction.

As shown in FIG. 3C, at step 338, process 300 includes authorizing or denying, based on the classification, the transaction the transaction processing network. For example, transaction service provider system 108 may authorize or deny, based on the classification, the transaction the transaction processing network. As an example, transaction service provider system 108 may, in response to classifying the transaction as a fraudulent transaction, deny authorization of the transaction in transaction processing network 101. As an example, transaction service provider system 108 may, in response to classifying the transaction as a non-fraudulent transaction, authorize the transaction in transaction processing network 101.

Experiment

Discussed below are experiments in which a universal data mixer with supervised anomaly detection according to non-limiting embodiments or aspects of the present disclosure (e.g., referred to as "AnoMix" in FIGS. 9-11) is evaluated against the state-of-the-art label-informed anomaly detection algorithms and numerous data augmentation approaches. The experiments aimed to answer the following questions: RQ: How does the proposed framework AnoMix compare against existing data augmentation methods?; RQ2: How does the proposed framework AnoMix compare against existing label-informed anomaly detection methods?; and RQ3: How does each component contribute to the performance of the proposed framework AnoMix?

Horizontal analysis was conducted to compare a framework according to non-limiting embodiments or aspects of the present disclosure (e.g., "AnoMix") with data augmentation methods on three different classifiers. Vertical analysis that compares the proposed framework with label-informed anomaly detectors was also conducted. FIG. 8 is a table summarizing statistics of datasets used for the experiment. As shown in FIG. 8, the following five benchmark datasets from different domains were used: a Japanese Vowels dataset, an Annthyroid dataset, a Mammography dataset, a Satellite dataset, and an SMTP dataset.

The Japanese Vowels dataset contains utterances of/ae/ that were recorded from nine speakers with 12 LPC cepstrum coefficients. The goal is to identify the outlier speaker.

The Annthyroid dataset is a set of clinical records that record 21 physical attributes of over 7200 patients. The goal is to identify the patients that are potentially suffering from hypothyroidism.

The Mammography dataset is composed of 6 features extracted from the images, including shape, margin, density, etc. The goal is to identify malignant cases that could potentially lead to breast cancer.

The Satellite dataset contains the remote sensing data of 6,435 regions, where each region is segmented into a 3×3 square neighborhood region and is monitored by 4 different light wavelengths captured from the satellite images of the Earth. The goal is to identify regions with abnormal soil status.

The SMTP has 95,156 server connections with 41 connection attributes including duration, src_byte, dst_byte, and so on. The task is to identify malicious attacks from the connection log.

Each of the datasets is publically available in OpenML. Widely adopted protocol proposed by the ODDS Library was used to process the data.

Figure 9:
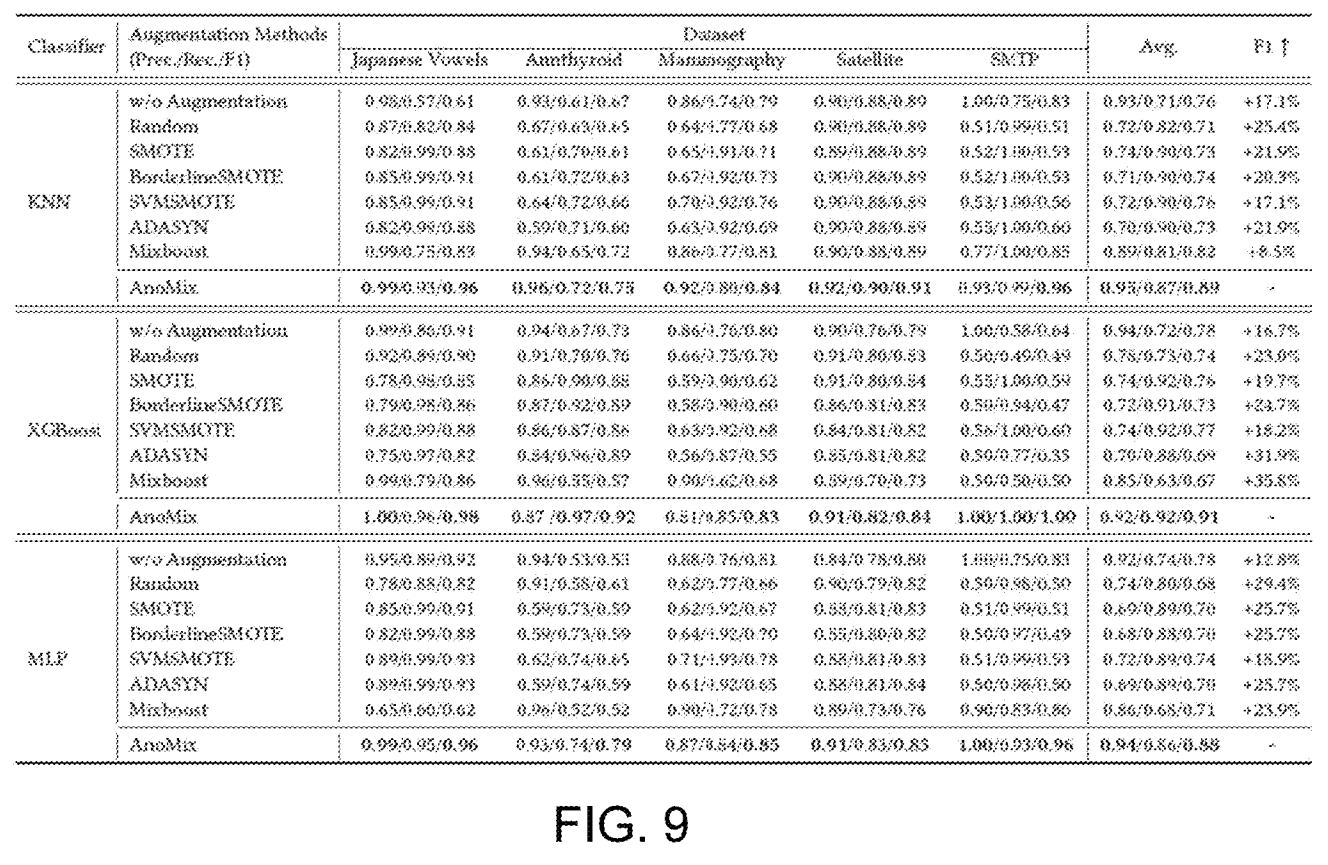

FIG. 9 is a table summarizing a horizontal comparison between a framework according to non-limiting embodiments or aspects of the present disclosure (e.g., "AnoMix") and the following representative data augmentation methods conducted on 3 different classifiers (i.e., KNN, XGBoost, MLP). Random is a basic baseline which generates synthetic anomalies by randomly averaging two existing anomalies. SMOTE linearly combines existing anomalies with their K-nearest anomalies through randomly sampled combination ratios. BorderlineSMOTE identifies a borderline between anomalies and normal samples with the K-nearest neighborhood of each anomaly. Then, the SMOTE is performed on the anomalies in the borderline area. SVMS-MOTE introduces a support vector classifier to identify a borderline between anomalies and normal samples and perform SMOTE on anomalies near to the borderline. ADASYN calculates the number of synthetic samples generated from individual anomalies using the estimated local distribution and then performs SMOTE on them. MixBoost uses a randomly sampled combination ratio to mix anomalies and normals. The number of oversamples for individual anomalies is weightily sampled based on the entropy of the underlying classifier.

FIG. 10 is a table summarizing a vertical comparison between a framework according to non-limiting embodiments or aspects of the present disclosure (e.g., "AnoMix") and label-informed detection algorithms to study the effectiveness of synthetic oversampling. XGBOD exploits the anomalous scores of individual data points generated from multiple unsupervised algorithms as the input feature for the underlying XGBoost classifier. DeepSAD develops a semi-supervised loss function which classifies the known normal samples and unlabeled samples into a unified cluster and deviates the known anomalies from the cluster. DevNet uses label information with a prior probability to enforce significant deviations in anomaly scores from the majority of normal samples.

Macro-averaged precision, recall, and F1-score, which compute the scores separately for each class and average the scores, were adopted as an evaluation protocol. The intuition behind this is to equalize the significance of anomaly detection and normal sample classification since the minimum false alarms is also a critical evaluation criterion. 5-fold cross validation was conducted with 80% data for training and 20% for testing. In addition, 40% of the training data is further split into a validation set for our framework to generate reward signals or for baseline methods to perform model tuning. The average performance on the testing set is reported.

For the horizontal analysis, a KNN classifier with k=15, a XGBoost classifier with the linear kernel, and the Adam optimizer with relu activation function for a 128-64 multi-layer perceptron classifier were used. For the vertical analysis, XGBOD from PyOD and public available implementations of DevNet and DeepSAD were adopted. Since the output of Dev and DeepSAD are anomaly scores, the thresholds for the two methods from {0.5×, 1.0×, 1.5×, 2.0×} of the anomaly ratio $\alpha$ re searched for to perform classification and report the best result. For the framework according to non-limiting embodiments or aspects of the present disclosure, a maximum neighborhood size K=15, a reward coefficient $\lambda$=10.0, a window size for baseline m=25 were used and the macro-averaged F1-score for the reward signal $\Delta \mathcal{M}$ was adopted.

Referring again to FIG. 9, to answer RQ1, a framework according to non-limiting embodiments or aspects of the present disclosure (e.g., "AnoMix") is compared to cutting-edge synthetic oversampling methods for anomaly detection. As shown in FIG. 9, the macro-averaged precision, recall, and F1-score of each data augmentation method across 3 different classifiers are tabulated. The performances without data augmentation on the original classifiers are also reported to show insights into how different classifiers impact the performances. In general, the framework according to non-limiting embodiments or aspects of the present disclosure is able to significantly outperform all of the baseline augmentation methods and achieve at least 8.5% and at most 29.4% improvements on the F1-score. Based on FIG. 9, the following observations can be made.

First, by comparing the baseline augmentation methods with the classifiers without data augmentation, it can be observed that the performance of the baseline augmentation methods are generally inferior to the classifier trained without data augmentation. Specifically, the average F1-scores of the baseline augmentation methods are consistently lower than the vanilla classifiers on the five datasets. The only exception is the Mixboost with KNN classifier, which is due to its decent performance on the SMTP dataset. Further investigation into this phenomenon suggests that randomly mixing up normal samples with anomalies when anomalies are extremely sparse is able to create beneficial synthetic normal samples that concrete the decision boundary. This supports the claim that the existing data augmentation methods are not capable of handling the diverse behavior of anomalies and may lead to noisy synthetic samples, but that generalizing label anomaly information by mixing up normal samples with anomalies could alleviate the problem.

Second, by comparing a framework according to non-limiting embodiments or aspects of the present disclosure (e.g., "AnoMix") with the vanilla classifier without data augmentation, we observe that a framework according to non-limiting embodiments or aspects of the present disclosure consistently outperforms all of the vanilla classifiers. On the five datasets, a framework according to non-limiting embodiments or aspects of the present disclosure improves the F1-score of KNN, XGBoost, and MLP classifiers by 17.1%, 16.7%, and 12.8%, respectively. This phenomenon suggests that a framework according to non-limiting embodiments or aspects of the present disclosure is able to adaptively create synthetic samples for different classifiers toward performance improvements. In addition, it is also observed that the KNN classifier has the maximum improvement, which suggests that the nearest-neighbor exploration of the transition function favors the classifier with similar attributes. Another interesting observation is that the more complex the models, the fewer the improvements. A possible explanation is that complex models tend to be overconfident on the prediction, which may lead to noisy prediction uncertainty reward and therefore mislead the learning procedure of the augmentation strategy.

Third, by comparing a framework according to non-limiting embodiments or aspects of the present disclosure (e.g., "AnoMix") with all other data augmentation methods, it is observed that a framework according to non-limiting embodiments or aspects of the present disclosure outperforms all baselines with the three classifiers on Macro-F1 scores. Specifically, a framework according to non-limiting embodiments or aspects of the present disclosure (e.g., "AnoMix") averagely outperforms the F1-score of the second best augmentation method with KNN, XGBoost, and MLP classifiers on the five datasets by 8.5%, 18.2% and 18.9%, respectively. Because Mixboost is similar to AnoMix with a random mix up policy, it implies that the proposed framework can learn tailored mix up policies for different classifiers and data samples. It can also be observed that, although a framework according to non-limiting embodiments or aspects of the present disclosure (e.g., "AnoMix") may not always be superior to all other baselines on precision and recall, the F1-scores are always the best. This phenomenon suggests that a framework according to non-limiting embodiments or aspects of the present disclosure is able to balance the trade-off between precision and recall, and therefore leads to superior F1-scores in all settings. A reason behind this is that a framework according to non-limiting embodiments or aspects of the present disclosure may adopt the Macro-F1 to form a reward signal. A user may also tailor their own metrics (e.g., precision, recall, tailored metrics, etc.) to obtain an anomaly detector that meets their requirements.

Fourth, by taking a detailed comparison between a framework according to non-limiting embodiments or aspects of the present disclosure (e.g., "AnoMix") with SVMSMOTE and BorderlineSMOTE, it can be observed that the F1-score of a framework according to non-limiting embodiments or aspects of the present disclosure is superior to the two baselines by at least 17.1%, 18.2% and 18.9% with three different classifiers. This phenomenon suggests that the instance-wise prediction uncertainty in the reward function is a better approach to generate tailored beneficial synthetic samples for different classifiers. The rationale behind this is that the two baselines identify the class boundary in the label space and the hyperspace of the SVM, where a framework according to non-limiting embodiments or aspects of the present disclosure (e.g., "AnoMix") identifies the boundary that is directly defined by the underlying classifier. By encouraging the policy to generate samples on the boundary defined by the classifier, it is more likely to create beneficial information that cannot be observed from the original feature space or the hyperspace of another classifier.

Referring again to FIG. 10, to answer RQ2, a framework according to non-limiting embodiments or aspects of the present disclosure (e.g., "AnoMix") is compared to the most advanced label-informed anomaly detection algorithms and baseline augmentation methods. FIG. 10 presents the macro-averaged precision, recall, and F1-score of each method on the 5 datasets. "Best baseline" refers to the horizontal baseline with the best F1-score on individual datasets. The following two observations can be made from FIG. 10.

First, data augmentation methods generally outperform label informed anomaly detectors. Comparing the best data augmentation baseline to the three label-informed approaches, the best data augmentation baseline outperforms the best label-informed algorithm by 6.2%. This suggests that, data augmentation method may be a more effective way to generalize label information when incorporated with proper strategy. Additionally, a framework according to non-limiting embodiments or aspects of the present disclosure (e.g., "AnoMix") with a properly learned strategy achieves superior performance, which further validates the suggestion above.

Second, label-informed methods achieve better precision and lower recall. By cross comparison to FIG. 9, it can be observed that the average precision of label-informed approaches is generally superior to data augmentation methods on all three classifiers, whereas the average recall is generally inferior to those baselines. The possible explanation is that label-informed approaches can only exploit the labels themselves, while data augmentation methods are capable of exploring potentially beneficial information from the limited label information. This suggests that label-informed approaches tend to over-fit existing labels and are therefore suboptimal.

Referring now to FIG. 11, which is a table of macro-averaged scores of a framework according to non-limiting embodiments or aspects of the present disclosure (e.g., "AnoMix") with the KNN classifier and the ablations on the Japanese Vowels dataset, an ablation study on the Japanese Vowels dataset with the KNN classifier was conducted to answer the question RQ3. As the reward signal may be the most critical guidance toward optimal augmentation strategies, the reward function is ablated to study the contribution of individual components. Note that random reward generates a reward signal with a random floating number from 0 to 1, which potentially leads to a random augmentation strategy. The following observations can be made from FIG. 11.

First, the proposed MDP is solvable, and the tailored RL agent is capable of learning an optimal strategy. By comparing the random reward baseline with a framework according to non-limiting embodiments or aspects of the present disclosure (e.g., "AnoMix"), it can be observed that there are significant improvements on all three scores. As both the two ablations on Equations (6) and (7) are significantly better than the random reward baseline, this suggests that the tailored RL agent is capable of addressing the MDP toward an optimal augmentation strategy.

Second, the two components in the proposed reward signal play significant roles in an optimal augmentation strategy. Specifically, both components are capable of increasing the exploitation of the label information and therefore lead to significant improvements in precision. On one hand, as the classifier may suffer from underfitting during the training procedure, learning the augmentation strategy without Equation (6) may lead to a significant performance drop. On the other hand, without considering the model status via Equation (7), it is less possible to identify potentially beneficial information for the underlying classifier and therefore lead to lower recall.

Accordingly, non-limiting embodiments or aspects of the present disclosure may provide a universal data mixer that is capable of incorporating different classifiers to exploit and explore potentially beneficial information from label information for supervised anomaly detection by using an iterative mix-up process to consider feature distribution and model status at the same time, by formulating the iterative mix up into a Markov decision process (MDP), and/or by providing a reward function to guide the policy learning procedure while the classifier is under-fitting. To solve the MDP, non-limiting embodiments or aspects of the present disclosure provide a deep actor-critic framework to optimize on a discrete-continuous action space. In this way, non-limiting embodiments or aspects of the present disclosure may generalize label information by simultaneously traversing the feature space while considering the model status, formulate the iterative mix up into a Markov decision process and design a combinatorial reward signal to guide the mix-up process, and/or tailor a deep reinforcement learning algorithm to address the discrete-continuous action space for learning an optimal mix-up policy.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A method, comprising:
    obtaining, with at least one processor, a training dataset $X^{train}$ including a plurality of source samples including a plurality of labeled normal samples and a plurality of labeled anomaly samples;
    executing, with the at least one processor, a training episode by:
    (i) initializing a timestamp t;
    (ii) receiving, from an actor network $\pi$ of an actor critic framework including the actor network $\pi$ and a critic network Q, an action vector $a_t$ for the timestamp t, wherein the actor network $\pi$ is configured to generate the action vector $a_t$ based on a state $s_t$, wherein the state $s_t$ is determined based on a current pair of source samples of the plurality of source samples, and wherein the action vector $a_t$ includes a size of a nearest neighborhood k, a composition ratio $\alpha$, a number of oversampling n, and a termination probability $\in$;
    (iii) combining the current pair of source samples according to the composition ratio $\alpha$ and the number of oversampling n to generate a labeled synthetic sample $x_{syn}$ associated with a label $y_{syn}$;
    (iv) training, using the labeled synthetic sample $x_{syn}$ and the label $y_{syn}$, a machine learning classifier $\phi$;
    (v) obtaining, based on the size of a nearest neighborhood k, source samples in the k-nearest neighborhood of the labeled synthetic sample $x_{syn}$;
    (vi) generating, with the machine learning classifier $\phi$, for the source samples in the k-nearest neighborhood of the labeled synthetic sample $x_{syn}$ and a subset of the plurality of source samples of the training dataset $X^{train}$ in a validation dataset $X^{val}$, a plurality of classifier outputs;
    (vii) selecting, from the source samples in the k-nearest neighborhood of the labeled synthetic sample $x_{syn}$, a next pair of source samples;
    (viii) storing, in a memory buffer, the state $s_t$, the action vector $a_t$, a next state $s_{t+1}$, and a reward $r_t$, wherein the next state $s_{t+1}$ is determined based on the next pair of source samples, and wherein the reward $r_t$ is determined based on the plurality of classifier outputs;
    (ix) determining whether the termination probability $\in$ satisfies a termination threshold;
    (x) in response to determining that the termination probability $\in$ fails to satisfy the termination threshold, incrementing the timestamp t, for a number of training steps S:
        training the critic network Q according to a critic loss function that depends on the state $s_t$, the action vector $a_t$, and the reward $r_t$; and
        training the actor network $\pi$ according to an actor loss function that depends on an output of the critic network, and
    after training the actor network $\pi$ and the critic network Q for the number of training steps S, returning to step (ii) with the next pair of source samples as the current pair of source samples;
    (xi) in response to determining that the termination probability $\in$ satisfies the termination threshold, determining whether the number of training episodes executed satisfies a threshold number of training episodes;
    (xii) in response to determining that the number of training episodes executed fails to satisfy the threshold number of training episodes, return to step (i) to execute a next training episode; and
    (xiii) in response to determining that the number of training episodes executed satisfies the threshold number of training episodes, provide the machine learning classifier $\phi$, wherein the plurality of source samples is associated with a plurality of transactions in a transaction processing network, wherein the plurality of labeled normal samples is associated with a plurality of non-fraudulent transactions of the plurality of transactions, and wherein the plurality of labeled anomaly samples is associated with a plurality of fraudulent transactions of the plurality of transactions;

receiving, with the at least one processor, transaction data associated with a transaction currently being processed in the transaction processing network:

processing, with the at least one processor, using the trained machine learning classifier ϕ, the transaction data to classify the transaction as a fraudulent or non-fraudulent transaction; and in response to classifying the transaction as a fraudulent transaction, denying, with the at least one processor, authorization of the transaction in the transaction processing network.

2. The method of claim 1, wherein the current pair of source samples are combined according to the composition ratio α to generate the labeled synthetic sample $x_{syn}$ according to the following Equations:

$$x_{syn} = \alpha * x_0 + (1-\alpha) * x_1$$

$$y_{syn} = \begin{cases} y_0, & \alpha \geq 0.5 \\ y_1, & \text{otherwise} \end{cases}$$

where $x_0$ is a first sample of the current pair of samples, $x_i$ is a second sample of the current pair of samples, $y_{syn}$ is a hard label for the labeled synthetic sample $x_{syn}$, $y_0$ is a first hard label value, and $y_1$ is a second hard label value.

3. The method of claim 1, wherein the reward $r_t$ is determined according to the following Equations:

$$\Delta M(\phi_t) = M(\phi_t(X^{val}), y^{val}) - \frac{\sum_{i=t-m}^{t-1} M(\phi_i(X^{val}), y^{val})}{m-1}$$

$$C(\phi_t|s_t, a_t) = \frac{1}{k}\sum_{i=0}^{k} P(y_i = 0|x_i, \phi_t)P(y_i = 1|x_i, \phi_t)$$

where M is an evaluation metric, $\Delta M(\phi_t)$ measures a performance improvement of the trained classifier $\phi_t$, $X^{val}$ is the validation data set, $y^{val}$ is a label set for the training data set, where $$\frac{\sum_{i=t-m}^{t-1} M(\phi_i(X^{val}), y^{val})}{m-1}$$

is a baseline for the timestamp t, m is a hyperparameter to define a buffer size for forming the baseline, C(otlst, at) evaluates a model confidence of the trained classifier $\phi_t$, P is a model exploration function, k is the size of the nearest neighborhood specified by the action vector $a_t$, $x_i$ is a k-nearest neighborhood of the labeled synthetic sample $x_{syn}$ in timestamp t, and $y_1$ is a label for $x_1$.

4. The method of claim 1, wherein the actor loss function is defined according to the following Equation:

$$L_\pi(\theta_1) = -\frac{1}{N}\sum_{i=1}^{N} Q(s_i, \pi(s_i)|\theta_2)$$

where N is a number of transitions, $\pi(s_i|\theta_2)$ is a projected action for a state $s_i$, and $Q(s_i, \pi(s_i)|\theta_2)$ is an output of the critic network for the projected action $\pi(s_i|\theta_2)$ and state $s_i$, and wherein the critic loss function is defined according to the following Equation:

$$L_Q(\theta_2) = [Q(s_t, a_t) - b_t]^2$$

where $b_t = R(s_t, a_t) + \gamma Q(s_{t+1}, \pi(s_{t+1}|\theta_1)|\theta_2)$, $\pi(s_{t+1}|\theta_1)$ is an action specified by the actor network, and γ is a decade factor.

5. The method of claim 1, further comprising:

before executing the training episode:

training, with the at least one processor, using the training dataset $X^{train}$ the machine learning classifier ϕ, and pre-computing, with the at least one processor, each k-nearest neighborhood for each source sample of the plurality of source samples in the training dataset $X^{train}$.

6. A system, comprising:

at least one processor programmed and/or configured to:

obtain a training dataset $X^{train}$ including a plurality of source samples including a plurality of labeled normal samples and a plurality of labeled anomaly samples;

execute a training episode by:

(i) initializing a timestamp t;

(ii) receiving, from an actor network π of an actor critic framework including the actor network π and a critic network Q, an action vector $a_t$ for the timestamp t, wherein the actor network π is configured to generate the action vector $a_t$ based on a state $s_t$, wherein the state $s_t$ is determined based on a current pair of source samples of the plurality of source samples, and wherein the action vector $a_t$ includes a size of a nearest neighborhood k, a composition ratio α, a number of oversampling n, and a termination probability ∈;

(iii) combining the current pair of source samples according to the composition ratio α and the number of oversampling n to generate a labeled synthetic sample $x_{syn}$ associated with a label $y_{syn}$;

(iv) training, using the labeled synthetic sample $x_{syn}$ and the label $y_{syn}$, a machine learning classifier ϕ;

(v) obtaining, based on the size of a nearest neighborhood k, source samples in the k-nearest neighborhood of the labeled synthetic sample $x_{syn}$;

(vi) generating, with the machine learning classifier ϕ, for the source samples in the k-nearest neighborhood of the labeled synthetic sample $x_{syn}$ and a subset of the plurality of source samples of the training dataset $X^{train}$ in a validation dataset $X^{val}$, a plurality of classifier outputs;

(vii) selecting, from the source samples in the k-nearest neighborhood of the labeled synthetic sample $x_{syn}$, a next pair of source samples;

(viii) storing, in a memory buffer, the state $s_t$, the action vector at, a next state $s_t+1$, and a reward $r_t$, wherein the next state $s_{t+1}$ is determined based on the next pair of source samples, and wherein the reward $r_t$ is determined based on the plurality of classifier outputs;

(ix) determining whether the termination probability ∈ satisfies a termination threshold;

(x) in response to determining that the termination probability ∈ fails to satisfy the termination threshold, incrementing the timestamp t, for a number of training steps S:
training the critic network Q according to a critic loss function that depends on the state $s_t$, the action vector $a_t$, and the reward $r_t$; and
training the actor network π according to an actor loss function that depends on an output of the critic network, and
after training the actor network π and the critic network Q for the number of training steps S, returning to step (ii) with the next pair of source samples as the current pair of source samples;
(xi) in response to determining that the termination probability E satisfies the termination threshold, determining whether the number of training episodes executed satisfies a threshold number of training episodes;
(xii) in response to determining that the number of training episodes executed fails to satisfy the threshold number of training episodes, return to step (i) to execute a next training episode; and
(xiii) in response to determining that the number of training episodes executed satisfies the threshold number of training episodes, provide the machine learning classifier ϕ, wherein the plurality of source samples is associated with a plurality of transactions in a transaction processing network, wherein the plurality of labeled normal samples is associated with a plurality of non-fraudulent transactions of the plurality of transactions, and wherein the plurality of labeled anomaly samples is associated with a plurality of fraudulent transactions of the plurality of transactions;
receive transaction data associated with a transaction currently being processed in the transaction processing network;
process, using the trained machine learning classifier ϕ, the transaction data to classify the transaction as a fraudulent or non-fraudulent transaction; and
in response to classifying the transaction as a fraudulent transaction, deny authorization of the transaction in the transaction processing network.

7. The system of claim 6, wherein the current pair of source samples are combined according to the composition ratio α to generate the labeled synthetic sample $x_{syn}$ according to the following Equations:

$$x_{syn} = \alpha * x_0 + (1-\alpha) * x_1$$

$$y_{syn} = \begin{cases} y_0, & \alpha \geq 0.5 \\ y_1, & \text{otherwise} \end{cases}$$

where $x_0$ is a first sample of the current pair of samples, $x_i$ is a second sample of the current pair of samples, $y_{syn}$ is a hard label for the labeled synthetic sample $x_{syn}$, $y_0$ is a first hard label value, and $y_1$ is a second hard label value.

8. The system of claim 6, wherein the reward re is determined according to the following Equations:

$$\Delta M(\phi_t) = M(\phi_t(X^{val}), y^{val}) - \frac{\sum_{i=t-m}^{t-1} M(\phi_i(X^{val}), y^{val})}{m-1}$$

$$C(\phi_t|s_t, a_t) = \frac{1}{k}\sum_{i=0}^{k} P(y_i = 0|x_i, \phi_t)P(y_i = 1|x_i, \phi_t)$$

where M is an evaluation metric, $\Delta M(\phi_t)$ measures a performance improvement of the trained classifier $\phi_t$, $X^{val}$ is the validation data set, $y^{val}$ is a label set for the training data set, where $$\frac{\sum_{i=t-m}^{t-1} M(\phi_i(X^{val}), y^{val})}{m-1}$$

is a baseline for the timestamp t, m is a hyperparameter to define a buffer size for forming the baseline, $C(\phi_t|st, at)$ evaluates a model confidence of the trained classifier $\phi_t$, P is a model exploration function, k is the size of the nearest neighborhood specified by the action vector $a_t$, $x_i$ is a k-nearest neighborhood of the labeled synthetic sample $x_{syn}$ in timestamp t, and $y_1$ is a label for $x_1$.

9. The system of claim 6, wherein the actor loss function is defined according to the following Equation:

$$L_\pi(\theta_1) = -\frac{1}{N}\sum_{i=1}^{N} Q(s_i, \pi(s_i)|\theta_2)$$

where N is a number of transitions, $\pi(s_i|\theta_2)$ is a projected action for a state $s_i$, and $Q(s_i, \pi(s_i)|\theta_2)$ is an output of the critic network for the projected action $\pi(s_i|\theta_2)$ and state $s_i$, and
wherein the critic loss function is defined according to the following Equation:

$$L_Q(\theta_2) = [Q(s_t, a_t) - b_t]^2$$

where $b_t = R(s_t, a_t) + \gamma Q(s_{t+1}, \pi(s_{t+1}|\theta_1)|\theta_2)$, $\pi(s_{t+1}|\theta_1)$ is an action specified by the actor network, and γ is a decade factor.

10. The system of claim 6, wherein the at least one processor is further programmed and/or configured to:
before executing the training episode:
train, using the training dataset $X^{train}$, the machine learning classifier ϕ; and
pre-compute each k-nearest neighborhood for each source sample of the plurality of source samples in the training dataset $X^{train}$.

11. A computer program product including a non-transitory computer readable medium including program instructions which, when executed by at least one processor, cause the at least one processor to:
obtain a training dataset $X^{train}$ including a plurality of source samples including a plurality of labeled normal samples and a plurality of labeled anomaly samples; and
execute a training episode by:
(i) initializing a timestamp t;
(ii) receiving, from an actor network π of an actor critic framework including the actor network π and a critic network Q, an action vector $a_t$ for the timestamp t, wherein the actor network π is configured to generate the action vector $a_t$ based on a state $s_t$, wherein the state $s_t$ is determined based on a current pair of source samples of the plurality of source samples, and wherein the action vector $a_t$ includes a size of a nearest neighborhood k, a composition ratio α, a number of oversampling n, and a termination probability ∈;

(iii) combining the current pair of source samples according to the composition ratio α and the number of oversampling n to generate a labeled synthetic sample $x_{syn}$ associated with a label $y_{syn}$;

(iv) training, using the labeled synthetic sample $x_{syn}$ and the label $y_{syn}$, a machine learning classifier ϕ;

(v) obtaining, based on the size of a nearest neighborhood k, source samples in the k-nearest neighborhood of the labeled synthetic sample $x_{syn}$;

(vi) generating, with the machine learning classifier ϕ, for the source samples in the k-nearest neighborhood of the labeled synthetic sample $x_{syn}$ and a subset of the plurality of source samples of the training dataset $X^{train}$ in a validation dataset $X^{val}$, a plurality of classifier outputs;

(vii) selecting, from the source samples in the k-nearest neighborhood of the labeled synthetic sample $x_{syn}$, a next pair of source samples;

(viii) storing, in a memory buffer, the state $s_t$, the action vector $a_t$, a next state $s_t+1$, and a reward $r_t$, wherein the next state $s_{t+1}$ is determined based on the next pair of source samples, and wherein the reward $r_t$ is determined based on the plurality of classifier outputs;

(ix) determining whether the termination probability ∈ satisfies a termination threshold;

(x) in response to determining that the termination probability ∈ fails to satisfy the termination threshold, incrementing the timestamp t, for a number of training steps S:
training the critic network Q according to a critic loss function that depends on the state $s_t$, the action vector $a_t$, and the reward $r_t$; and
training the actor network π according to an actor loss function that depends on an output of the critic network, and
after training the actor network π and the critic network Q for the number of training steps S, returning to step (ii) with the next pair of source samples as the current pair of source samples;

(xi) in response to determining that the termination probability ∈ satisfies the termination threshold, determining whether the number of training episodes executed satisfies a threshold number of training episodes;

(xii) in response to determining that the number of training episodes executed fails to satisfy the threshold number of training episodes, return to step (i) to execute a next training episode; and (xiii) in response to determining that the number of training episodes executed satisfies the threshold number of training episodes, provide the machine learning classifier ϕ, wherein the plurality of source samples is associated with a plurality of transactions in a transaction processing network, wherein the plurality of labeled normal samples is associated with a plurality of non-fraudulent transactions of the plurality of transactions, and wherein the plurality of labeled anomaly samples is associated with a plurality of fraudulent transactions of the plurality of transactions;

receive transaction data associated with a transaction currently being processed in the transaction processing network;

process, using the trained machine learning classifier ϕ, the transaction data to classify the transaction as a fraudulent or non-fraudulent transaction; and in response to classifying the transaction as a fraudulent transaction, deny authorization of the transaction in the transaction processing network.

12. The computer program product of claim 11, wherein the current pair of source samples are combined according to the composition ratio α to generate the labeled synthetic sample $x_{syn}$ according to the following Equations:

$$x_{syn} = \alpha * x_0 + (1-\alpha) * x_0$$

$$y_{syn} = \begin{cases} y_0, & \alpha \geq 0.5 \\ y_1, & \text{otherwise} \end{cases}$$

where $x_0$ is a first sample of the current pair of samples, $x_i$ is a second sample of the current pair of samples, $y_{syn}$ is a hard label for the labeled synthetic sample $x_{syn}$, $y_0$ is a first hard label value, and $y_1$ is a second hard label value.

13. The computer program product of claim 11, wherein the reward re is determined according to the following Equations:

$$\Delta M(\phi_t) = M(\phi_t(X^{val}), y^{val}) - \frac{\sum_{i=t-m}^{t-1} M(\phi_i(X^{val}), y^{val})}{m-1}$$

$$C(\phi_t|s_t, a_t) = \frac{1}{k}\sum_{i=0}^{k} P(y_i = 0|x_i, \phi_t) P(y_i = 1|x_i, \phi_t)$$

where M is an evaluation metric, $\Delta M(\phi_t)$ measures a performance improvement of the trained classifier $\phi_t$, $X^{val}$ is the validation data set, $y^{val}$ is a label set for the training data set, where $$\frac{\sum_{i=t-m}^{t-1} M(\phi_i(X^{val}), y^{val})}{m-1}$$

is a baseline for the timestamp t, m is a hyperparameter to define a buffer size for forming the baseline, $C(\phi_t|st, at)$ evaluates a model confidence of the trained classifier $\phi_t$, P is a model exploration function, k is the size of the nearest neighborhood specified by the action vector $a_t$, $x_i$ is a k-nearest neighborhood of the labeled synthetic sample $x_{syn}$ in timestamp t, and $y_1$ is a label for $x_1$.

14. The computer program product of claim 11, wherein the actor loss function is defined according to the following Equation:

$$L_\pi(\theta_1) = -\frac{1}{N}\sum_{i=1}^{N} Q(s_i, \pi(s_i)|\theta_2)$$

where N is a number of transitions, $\pi(s_i|\theta_2)$ is a projected action for a state $s_i$, and $Q(s_i, \pi(s_i)|\theta_2)$ is an output of the critic network for the projected action $\pi(s_i|\theta_2)$ and state $s_i$, and wherein the critic loss function is defined according to the following Equation:

$$L_Q(\theta_2) = [Q(s_t, a_t) - b_t]^2$$

where $b_t = R(s_t, a_t) + \gamma Q(s_{t+1}, \pi(s_{t+1}|\theta_1)|\theta_2)$, $\pi(s_{t+1}|\theta_1)$ is an action specified by the actor network, and $\gamma$ is a decade factor.

15. The computer program product of claim 11, wherein the program instructions, when executed by at least one processor, further cause the at least one processor to:
    before executing the training episode:
        train, using the training dataset $X^{train}$, the machine learning classifier $\phi$; and
        pre-compute, each k-nearest neighborhood for each source sample of the plurality of source samples in the training dataset $X^{train}$.

* * * * *

UNITED STATES PATENT AND TRADEMARK OFFICE
CERTIFICATE OF CORRECTION

Page 1 of 2

PATENT NO. : 12,242,939 B2
APPLICATION NO. : 18/686563
DATED : March 4, 2025
INVENTOR(S) : Kwei-Herng Lai et al.

It is certified that error appears in the above-identified patent and that said Letters Patent is hereby corrected as shown below:

In the Claims

Column 43, Line 6, Claim 1, delete "network:" and insert -- network; --

Column 43, Line 28, Claim 2, delete "$x_i$" and insert -- $x_1$ --

Column 43, Line 54, Claim 3, delete "C(ot|st, at)" and insert -- $C(\phi_t|s_t, a_t)$ --

Column 43, Line 59, Claim 3, delete "$y_1$" and insert -- $y_i$ --

Column 43, Line 59, Claim 3, delete "$x_1$." and insert -- $x_i$. --

Column 44, Line 15, Claim 5, delete "$X^{train}$" and insert -- $X^{train}$, --

Column 44, Line 16, Claim 5, delete "$\phi$," and insert -- $\phi$; --

Column 44, Line 59, Claim 6, delete "at," and insert -- $a_t$, --

Column 44, Line 59, Claim 6, delete "$s_t+1$," and insert -- $s_{t+1}$, --

Column 45, Line 15, Claim 6, delete "E" and insert -- $\in$ --

Column 45, Line 56, Claim 7, delete "$x_i$" and insert -- $x_1$ --

Column 45, Line 60, Claim 8, delete "re" and insert -- $r_t$ --

Column 46, Line 17, Claim 8, delete "$C(\phi_t|st, at)$" and insert -- $C(\phi_t|s_t, a_t)$ --

Column 46, Line 22, Claim 8, delete "$y_1$" and insert -- $y_i$ --

Signed and Sealed this
Twenty-ninth Day of April, 2025

Coke Morgan Stewart
*Acting Director of the United States Patent and Trademark Office*

CERTIFICATE OF CORRECTION (continued)
U.S. Pat. No. 12,242,939 B2

Column 46, Line 22, Claim 8, delete "$x_1$." and insert -- $x_i$. --

Column 47, Line 23, Claim 11, delete "$s_t+1$," and insert -- $s_{t+1}$, --

Column 48, Line 11, Claim 12, delete "*$x_0$" and insert -- *$x_1$ --

Column 48, Line 19, Claim 12, delete "$x_i$" and insert -- $x_1$ --

Column 48, Line 24, Claim 13, delete "re" and insert -- $r_t$ --

Column 48, Line 46, Claim 13, delete "$C(\phi_t|st, at)$" and insert -- $C(\phi_t|s_t, a_t)$ --

Column 48, Line 51, Claim 13, delete "$y_1$" and insert -- $y_i$ --

Column 48, Line 51, Claim 13, delete "$x_1$." and insert -- $x_i$. --